(12) United States Patent
Landsman et al.

(10) Patent No.: US 8,131,799 B2
(45) Date of Patent: Mar. 6, 2012

(54) USER-TRANSPARENT SYSTEM FOR UNIQUELY IDENTIFYING NETWORK-DISTRIBUTED DEVICES WITHOUT EXPLICITLY PROVIDED DEVICE OR USER IDENTIFYING INFORMATION

(75) Inventors: Rick Landsman, Cortland Manor, NY (US); Robert J. Walczak, Jr., New York, NY (US)

(73) Assignee: Media Stamp, LLC, Houston, TX (US)

( * ) Notice: Subject to any disclaimer, the term of this patent is extended or adjusted under 35 U.S.C. 154(b) by 103 days.

(21) Appl. No.: 12/548,080

(22) Filed: Aug. 26, 2009

(65) Prior Publication Data

US 2010/0057843 A1 Mar. 4, 2010

Related U.S. Application Data

(60) Provisional application No. 61/091,816, filed on Aug. 26, 2008.

(51) Int. Cl.
*G06F 15/173* (2006.01)
(52) U.S. Cl. ...................................................... 709/203
(58) Field of Classification Search .................. 709/203, 709/217, 223
See application file for complete search history.

(56) References Cited

U.S. PATENT DOCUMENTS

| | | | | |
|---|---|---|---|---|
| 6,085,224 A * | 7/2000 | Wagner | .......................... | 709/203 |
| 6,205,480 B1 * | 3/2001 | Broadhurst et al. | .......... | 709/225 |
| 6,275,854 B1 * | 8/2001 | Himmel et al. | ................ | 709/224 |
| 7,359,976 B2 * | 4/2008 | Ross et al. | ..................... | 709/229 |
| 7,570,943 B2 | 8/2009 | Sorvari et al. | | |
| 7,707,292 B2 * | 4/2010 | Henderson et al. | ........... | 709/227 |
| 7,925,694 B2 * | 4/2011 | Harris | ............................ | 709/203 |
| 2001/0036224 A1 | 11/2001 | Demello et al. | | |
| 2002/0123334 A1 | 9/2002 | Borger et al. | | |
| 2003/0074660 A1 | 4/2003 | McCormack et al. | | |
| 2003/0084165 A1 | 5/2003 | Kjellberg et al. | | |
| 2003/0233329 A1 | 12/2003 | Laraki et al. | | |
| 2005/0080665 A1 | 4/2005 | Bowman-Amuah | | |
| 2005/0166053 A1 | 7/2005 | Cui et al. | | |
| 2005/0171948 A1 | 8/2005 | Knight | | |
| 2005/0174975 A1 | 8/2005 | Mgrdechian et al. | | |
| 2006/0041581 A1 | 2/2006 | Aghvami et al. | | |
| 2006/0265507 A1 | 11/2006 | Banga et al. | | |
| 2006/0271690 A1 | 11/2006 | Banga et al. | | |
| 2006/0274753 A1 | 12/2006 | Park et al. | | |
| 2007/0011268 A1 | 1/2007 | Banga et al. | | |
| 2007/0030824 A1 | 2/2007 | Ribaudo et al. | | |
| 2008/0052375 A1 | 2/2008 | Banga et al. | | |
| 2008/0098112 A1 | 4/2008 | Banga et al. | | |
| 2008/0098459 A1 | 4/2008 | Banga et al. | | |

(Continued)

OTHER PUBLICATIONS

Passani, Luca. "New WURFL API and why it is important to upgrade". 2008. 5 pgs. http://wurfl.sourceforge.net/newapi/.

(Continued)

*Primary Examiner* — David Eng
(74) *Attorney, Agent, or Firm* — Michael D. Downs; Fincham Downs LLC

(57) ABSTRACT

A technique for uniquely identifying devices without explicitly provided device or user identifying information in a networked client-server environment, e.g., the Mobile Internet. In one aspect, a system retrieves a profile of a client device, retrieves all device profiles existing in a profile database, and sequentially eliminates profiles not matching until a single profile is left or all profiles have been used.

18 Claims, 10 Drawing Sheets

U.S. PATENT DOCUMENTS

| | | | |
|---|---|---|---|
| 2008/0200161 | A1 | 8/2008 | Morse et al. |
| 2008/0235351 | A1 | 9/2008 | Banga et al. |
| 2008/0244076 | A1 | 10/2008 | Shah et al. |
| 2008/0255944 | A1 | 10/2008 | Shah et al. |
| 2008/0262901 | A1 | 10/2008 | Banga et al. |
| 2008/0263633 | A1 | 10/2008 | Banga et al. |
| 2008/0288658 | A1 | 11/2008 | Banga et al. |
| 2008/0307112 | A1 | 12/2008 | Andreasson et al. |
| 2009/0017805 | A1 | 1/2009 | Sarukkai et al. |
| 2009/0049192 | A1 | 2/2009 | Banga et al. |
| 2009/0144159 | A1 | 6/2009 | Bashyam |
| 2009/0168995 | A1 | 7/2009 | Banga et al. |

OTHER PUBLICATIONS

"ProfileMigrateEventArgs.Anonymous ID Property". 2009. 3 pgs. http://msdn.microsoft.com/en-us/library/system.web.profile.profilemigrateeventargs.anony. . . .

"Server.Transfer Method". 2009. 2 pgs. http://msdn.microsoft.com/en-us/library/ms525800(pringer).aspx.

"User Identification for ASP.NET Profile Properties". 2009. 2 pgs. http://msdn.microsoft.com/en-us/library/ewfk772(printer).aspx.

"WURFL". Aug. 25, 2009. 3 pgs. http://wurfl.sourceforge.net/index.php.

* cited by examiner

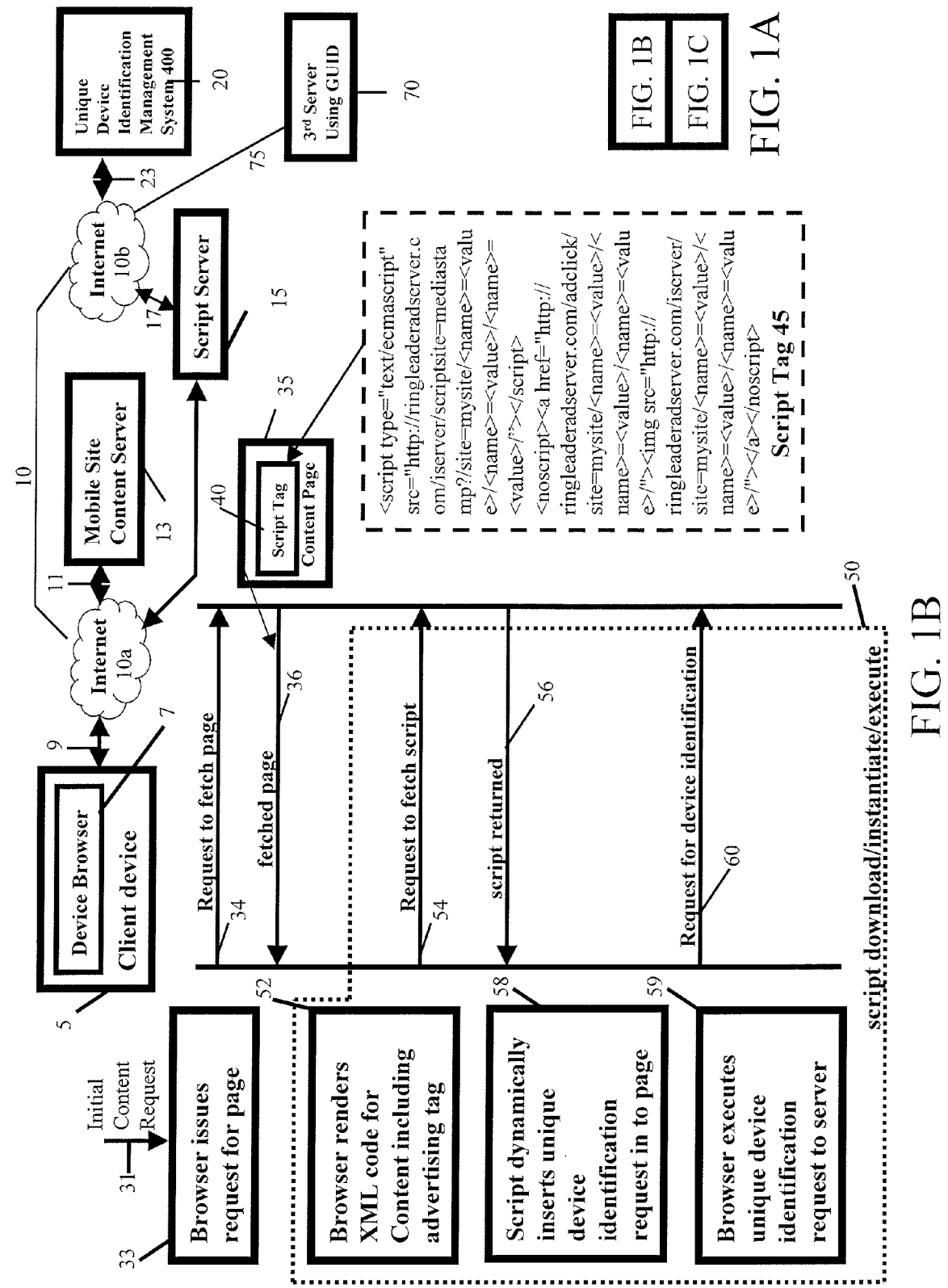

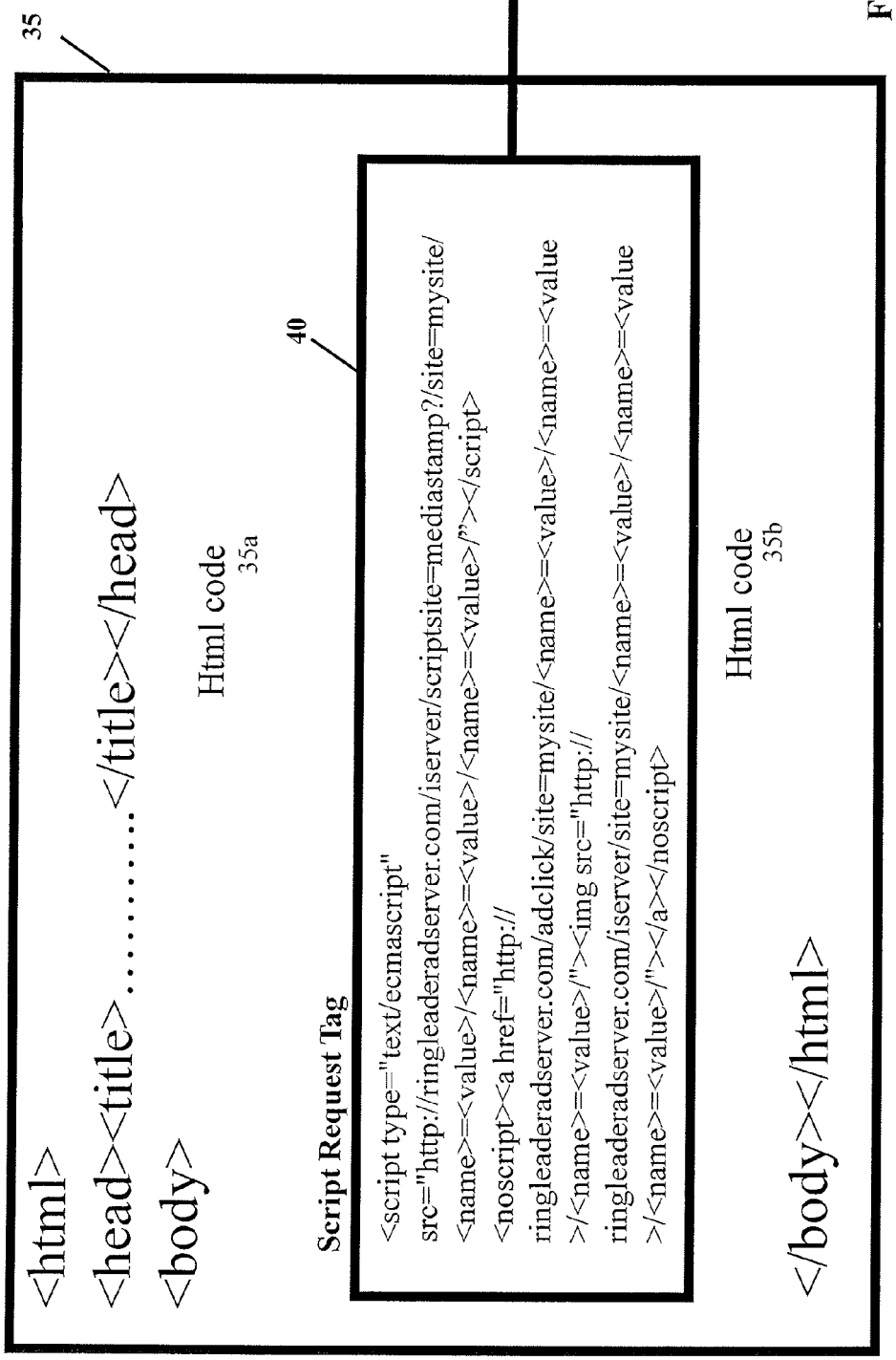

```
<profile><properties>
<add name="LastVisitedDate" type="System.DateTime" allowAnonymous="true" customProviderData="skip"/>
<add name="Name" allowAnonymous="true" type="string"/><add name="MoPhapCookie" allowAnonymous="true" type="string"/>
<add name="GUID" allowAnonymous="true" type="string"/><add name="Site" allowAnonymous="true" type="string"/>
<add name="RawReferer" allowAnonymous="true" type="string"/><add name="AcceptFileTypes" allowAnonymous="true" type="string"/>
<add name="HTTPHeaders" allowAnonymous="true" type="string"/><add name="UserIP" allowAnonymous="true" type="string"/>
<add name="AdSvrQueryString" allowAnonymous="true" type="string"/><add name="AdSvrReqDateTime" allowAnonymous="true" type="string"/>
<add name="AdSvrGUID" allowAnonymous="true" type="string"/><add name="AdSvrReferer" allowAnonymous="true" type="string"/>
<add name="AdSvrRequest" allowAnonymous="true" type="string"/><add name="AdSvrReqScript" allowAnonymous="true" type="string"/>
<add name="AdSvrReqQueryString" allowAnonymous="true" type="string"/>
<add name="AdSvrReqSITE" allowAnonymous="true" type="string"/><add name="AdSvrADFORMAT" allowAnonymous="true" type="string"/>
<add name="AdSvrCONTEXT1" allowAnonymous="true" type="string"/>
<add name="AdSvrCARRIER" allowAnonymous="true" type="string"/><add name="CarrierNetworkIP" allowAnonymous="true" type="string"/>
<add name="AdSvrDEVICE" allowAnonymous="true" type="string"/><add name="AdSvrSCRNWIDTH" allowAnonymous="true" type="string"/>
<add name="AdSvrSCRNHEIGHT" allowAnonymous="true" type="string"/><add name="AdSvrRANDOM" allowAnonymous="true" type="string"/>
<add name="AdSvrACCRANDOM" allowAnonymous="true" type="string"/><add name="Unique" allowAnonymous="true" type="string"/>
<add name="VisitsToDate" allowAnonymous="true" type="string"/><add name="PreviousDiscriminator" allowAnonymous="true" type="string"/>
<add name="DiscriminatorSearchResults" allowAnonymous="true" type="string"/>
<add name="BrowserName" allowAnonymous="true" type="string"/><add name="BrowserMajorVersion" allowAnonymous="true" type="string"/>
<add name="BrowserMinorVersion" allowAnonymous="true" type="string"/>
<add name="EcmaScriptVersion" allowAnonymous="true" type="string"/><add name="Psite" allowAnonymous="true" type="string"/>
<add name="AdFormat" allowAnonymous="true" type="string"/><add name="ProxyUserIdentifier" allowAnonymous="true" type="string"/>
<add name="HTTPHeaderList" allowAnonymous="true" type="string"/><add name="MVNO" allowAnonymous="true" type="string"/>
<add name="CookiesEnabled" allowAnonymous="true" type="string"/>
<add name="CacheBustRandom" allowAnonymous="true" type="string"/>
<add name="WIGSessionID" allowAnonymous="true" type="string"/><add name="ClickHTTPHeaderList" allowAnonymous="true" type="string"/>
<add name="RLDDATE" allowAnonymous="true" type="string"/><add name="RLDUTCOFFSET" allowAnonymous="true" type="string"/>
<add name="OPTOUT" allowAnonymous="true" type="string"/><add name="ClickAcceptFileTypes" allowAnonymous="true" type="string"/>
</properties></profile>
```

FIG. 5B     web.config profile properties

USER-TRANSPARENT SYSTEM FOR UNIQUELY IDENTIFYING NETWORK-DISTRIBUTED DEVICES WITHOUT EXPLICITLY PROVIDED DEVICE OR USER IDENTIFYING INFORMATION

CROSS REFERENCE TO RELATED APPLICATION

This application claims the benefit of U.S. Provisional Patent Application Ser. No. 61/091,816, filed Aug. 26, 2008, entitled, "MOBILE COOKIE ARCHITECTURE".

BACKGROUND OF THE INVENTION

1. Field of the Invention

The present invention relates to a system, specifically an apparatus and accompanying methods, for implementing in a networked client-server environment, such as the mobile Internet, an anonymous and user-transparent technique for uniquely identifying network-distributed devices without device or user identifying information provided explicitly for the purpose of identifying the client device.

2. Description of the Prior Art

Internet usage, and particularly that of the mobile Internet, is growing explosively, particularly as the number of mobile sites increase and users that have access to mobile devices continues to rapidly expand.

Mobile Internet devices are characterized by their constrained software environments, as well as by the peculiarities of the individual devices themselves. Constraints include minimal network bandwidth resulting in slow content retrieval, minimal CPU processing and memory facilities, as well as a dearth of persistent storage across sessions, called client side browser cookies. Traditional online advertising approaches, such as the tracking of individual users across sessions and controlling the frequency and relevance of advertising presented to them, simply do not exist in the mobile Internet today. Lack of standard advertising metrics for mobile campaigns, derived using browser cookies on the Web, such as the number of unique site visitors, has discouraged online advertisers from taking advantage of the unique personalized nature of mobile devices and local content.

Mobile usage modalities, often a result of the constrained network environment as well as device limitations themselves, severely hamper achieving the quality advertising experiences expected by web online users and expected by advertisers. For example, use of bookmarks to access sites visited on a regular basis is common, largely driven by the pain of entering full Internet site addresses. As a result of tiny mobile keyboards and user unfriendly forms based interfaces, very few users will type in content site addresses directly. Rather they find it far easier to use an on carrier deck search engine to locate relevant content, and then save a bookmark for the Wireless Application Protocol (WAP) deck or Internet Page they visit regularly, using that saved bookmark for future direct access.

Mobile Internet advertising currently consists of streaming graphic files, in real time, into content rendered by a user's mobile device browser. Image and text call to action advertising tags are embedded in the content at a publisher's content management system. This occurs prior to delivery of the actual content to the user over the wireless network. Current mobile practice for many of the server side include ad serving systems, is to log delivery of user impressions when the ad tags are transmitted from the ad server, across the Internet to the publisher's content system, whether or not they actually arrive.

As those skilled in the art will certainly appreciate, server-side include refers to a variable value (for example, a file "Last modified" date) that a server can include in an HTML file before it sends it to the requester. For example, where one is creating a Web page, an include statement can be inserted in the HTML file that looks like this:

<!--#echo var="LAST_MODIFIED"--> and the server will obtain the last-modified date for the file and insert it before the HTML file is sent to requesters.

A Web file that contains server-side include statements (such as the "echo" statement above) is usually defined by the administrator to be a file with an "." suffix. As such, one may consider a server-side include as a limited form of common gateway interface (CGI) application. In fact, the CGI is not used. The server simply searches the server-side include file for CGI environment variables, and inserts the variable information in the places in the file where the "include" statements have been inserted.

Upon receipt of advertising mark up tags over the Internet, they are then inserted into the content by the publisher's content management system. This occurs prior to transmission of the content to the end user device. The more desirable approach is to count impressions only after an actual presentation of the advertising to an end user. Since most mobile advertising systems have no way of determining whether an ad actually got delivered and played to completion, the result can be inaccurate impression accounting. Another example of the problem is users who navigate to a new content page before the entire ad has been rendered, which results in an impression reported erroneously even though those users never saw that advertisement.

Most publishers just can't afford the quantity of additional servers and complexity they require to manage multiple flavors of ad embedding software for multiple ad server vendors. This is needed in order to interface to multiple server side include systems just to obtain adequate inventory fill rates to fully monetize their content. The added requirement that publishers pay for their own bandwidth to interface to a server side include system in order to retrieve ad tags across the Internet, before they can insert them and then transmit the content to the user is simply not scalable across millions of simultaneous users. Just like for WEB advertising, client side delivery and counting mechanisms are necessary to accurately distribute revenue across multiple parties, as well as provide accurate auditing, long the standard in traditional advertising.

In view of the fundamental drawbacks associated with server side include mobile advertising systems, and the lack of reliable browser cookie implementations known in the art, automatic anonymous server side device identification and device profile management appears to hold the most promise of all these techniques. Yet, the limitations inherent in conventional implementations of mobile ad serving have effectively prevented this form of advertising from effectively fulfilling its promise. Moreover, the deficiencies inherent in all known mobile advertising techniques have, to a significant extent, collectively inhibited the use of mobile advertising in general.

A pressing need exists for a new system for anonymously and transparently uniquely identifying network-distributed devices without the requirement for explicitly provided device or user identifying information, which does not suffer from infirmities associated with such techniques known in the art. Therefore, there is a need to create a new anonymous unique device identifying system, which can be used by advertisers to expand the use of mobile advertising to mobile Internet devices.

SUMMARY OF THE INVENTION

The present invention relates to a system and method for implementing an anonymous and user-transparent technique for uniquely identifying network-distributed devices without device or user identifying information provided explicitly for the purpose of identifying the client device. In this way, the present inventive system satisfies the shortcomings and overcomes the deficiencies associated with mobile server side include advertising techniques and mobile devices that do not implement traditional online browser cookies or that allow disabling traditional online browser cookies (that is, device or user identifying information provided explicitly for the purpose of identifying the client device). Additionally, carrier gateways that filter out mobile device cookies prior to directing users to publisher sites will not negatively impact advertisers abilities to manage mobile advertising campaigns as well as their ability to report unique users and frequency cap the number of times a specific user is presented a specific advertisement.

The strategy at the heart of the unique solution for identifying visitors anonymously is elimination rather than selection. Visitors enter the advertising network implemented in accordance with the present invention through partner publisher sites and the present unique device identification management system anonymously uses elimination rather than selection when searching for the best client device profile matching a current user to whom the present system is delivering ads to from the database of previously recognized client devices. Nature doesn't do selection, rather all answers are possible via mutation, and less viable solutions are eliminated with "survival of the fittest" in the current environment bubbling up as the best solution fit. That is, the approach in accordance with the present invention is to search for matching profiles of visitor devices to which advertising was previously served and serve advertising on those visitors accordingly.

The key to being able to efficiently and uniquely identify users visiting a publisher network in accordance with the present invention is to use a weighted hierarchy of discriminators eliminating profiles until the best possible match is identified. A weighted hierarchy allows termination of a search immediately upon processing enough data to identify someone as a previous visitor. This is defined as someone for whom a device profile has already been created in the database of the present system. If the visitor doesn't match any existing database device profile, the visitor is then added as a new unique user. Information regarding the visitor is achieved by obtaining a variety of client device attributes from software scripts transparently inserted into a mobile device browser of the visitor's mobile device. Weighted attributes, made up of discriminating criteria placed "end to end" achieves an anonymous device signature unique to its owner. Discriminators are gleaned by device requests from software executing in the client device, and to WAP and Internet advertising and device detection and content transcoding servers. Additionally, scripts are able to read and communicate internal attributes from the device environment, which together ultimately make up digital signatures stored in a device profiles database of the present system.

With a hierarchy of discriminators, each weighted by their ability to discriminate amongst user profiles, the present system uses browser cookies as the first and highest weighted parametric, if cookies are supported by the client device. If a cookie has been set in accordance with the present system with a Globally Unique Identifier (GUID) for that user in their client device in the past, it is known he or she visited previously and the present system tagged them already with a unique identifier associated with that device profile in the database of the present system. Triplet Tuples are stored for each attribute and its value, within Microsoft's built in .NET Anonymous Profiling System. All discriminating attributes, including the whether or not the client device accepts cookies, and if so get stored in the device profile database as searchable records.

If a user accesses a network operating in accordance with the present invention and their client device does not support client side browser cookies, that attribute (i.e. the fact, the client device does not support cookies) still allows user discrimination by such information being set to null in the profile created for the specific client device, and is used to eliminate profiles containing actual cookies from further search. The present system continues to half split the remaining universe of profiles requiring further searching, for each additional discriminating device attribute, each of which gives a smaller and smaller universe of profiles required to pattern match against. If a match is not achieved once all attributes have been searched, a new profile is added to the database containing this current user's unique set of mobile device and wireless environment attributes, e.g., the carrier or mobile virtual network operator (MVNO) of the wireless network they subscribe to.

Logical data structures defining individual user profiles are best thought of as very long binary digital signatures. Those binary strings consist of concatenated attributes captured from requests to a variety of external anonymous unique device identification management servers from software executing in end user devices. Additional attributes, specifying the internal device environment, also get captured to provide additional bit strings that make up the full user device signature. Software scripts get transparently inserted through ad requests embedded in publisher content that then execute inside or outside the device on a time sliced basis. The software scripts delivered, execute in content pages for very limited time periods. Upon completion of the time slice, the script is replaced with the actual requests for device identification services to an anonymous unique device identification management system of the present invention and appear totally transparent to users.

Mobile device facilities for book marking sites visited by users, as well as the fact that unlike Web browsers, the URL of the current content displayed is not normally visible on user screens, allows using tagged bookmarks as the equivalent of a mobile browser history list cookie. Those ubiquitous bookmarks are one of the few objects persistent across Internet sessions, though not normally thought of as a mechanism for implementing persistent storage on devices without traditional browser cookies.

The use of Internet protocol redirect mechanism for user entry points to Internet sites provides an opportunity to uniquely tag those bookmark addresses with device identifying information in the browser history list. Redirect mechanisms are commonly understood to allow for the transfer of users from a selected content page to a different content page. The result is the storage of a unique user ID, associated with their carrier account that persists across Internet sessions within the mobile device browser bookmark persistent storage. That information is readily captured by the unique device identification management system of the present invention each time they access the bookmark, which can be associated with a specific partner site within the device profile database of the present system.

The present system uses Semantic Web RDF data stores, Triplets, for each attribute in the weighted hierarchy that make up user signatures. Each of those properties provides a searchable attribute maintained in the user's device anonymous profile. A good analogy of this approach is the children's game of 20 questions, since unknown objects can be guessed quickly, merely by eliminating properties not associated with a device as the search technique.

Search of RDF formatted user profiles lend themselves well to software with built in inference processing. By weighting signature criteria according to how discriminating they are, the present system is able to perform inference and terminate search of matching RDF profiles at the earliest opportunity, ensuring efficient scalable identification of existing profiles.

A very efficient integrated implementation is achieved by marrying Microsoft's .NET Anonymous Profiling facilities with the present anonymous unique device identification management system. This hybrid implementation strategy allows enhancing existing user profiles with additional discriminating parameters to uniquely identify mobile client devices, with additional inference rules, as the present system learns from audience analytics. Profiles of both systems can be expanded without impacting existing profile data structures, thus providing backward compatibility. To add new properties to the existing .NET Anonymous Profile database, you merely specify a default value for the new property in the .NET application's "web.config" file, i.e. <add name="FavoriteColor" defaultValue="Red"/>. The new property with that default configuration is automatically added to all existing profiles.

The present invention can be integrated with any number of current and future online advertising and/or user behavior engines. It provides persistent mobile device identification across mobile browsing sessions, normally performed by traditional client Internet World Wide Web browser applications, called browser cookies. In the mobile environment, a majority of client devices currently lack client side browser cookie facilities, or allow them to be disabled by the user or carrier at their Internet gateway. Device profiles in accordance with the present invention can provide this identification mechanism necessary to monitor a specific user's mobile content consumption, over time, in order to accumulate, store and associate past context consumption with a specific persistent identifier. These identifiers can then be used to target future marketing communication messages pertinent to a specific user and their past or predicted future behavior.

BRIEF DESCRIPTION OF THE DRAWINGS

The teachings of the present invention can be readily understood by considering the following detailed description in conjunction with the accompanying drawings.

FIG. 1A depicts the correct alignment of the drawing sheets for FIGS. 1B and 1C.

FIGS. 1B and 1C collectively depict a high-level block diagram of an illustrative client-server distributed processing environment, implemented through the Internet, which embodies the teachings of the present invention, along with, as pertinent to the invention, basic inter-computer actions between the client device and components of the present system that occur in that environment and associated client processing operations (uses ladder that extends from FIG. 1B to FIG. 1C).

FIG. 2 depicts the correct alignment of the drawing sheets for FIGS. 2A and 2B.

FIGS. 2A and 2B collectively depict generalized web page HTML code 35, specifically including Script Request or unique device identification tag 40, which transparently invokes the present invention, and changes which the present invention dynamically makes to that code, specifically insertion of a dynamically generated unique device identification request 210 for tag 40 to yield page 35', in order to determine the device profile and retrieve a globally unique device identifier, GUID, from the device identification management system.

FIG. 5 depicts the correct alignment of the drawing sheets for FIGS. 5A and 5B.

FIGS. 5A and 5B collectively depict a high-level block diagram of the unique device profile management system, and a representative Microsoft .NET application "web.config" file defining the device profiles data.

DETAILED DESCRIPTION OF THE PREFERRED EMBODIMENTS

Figure 1C:
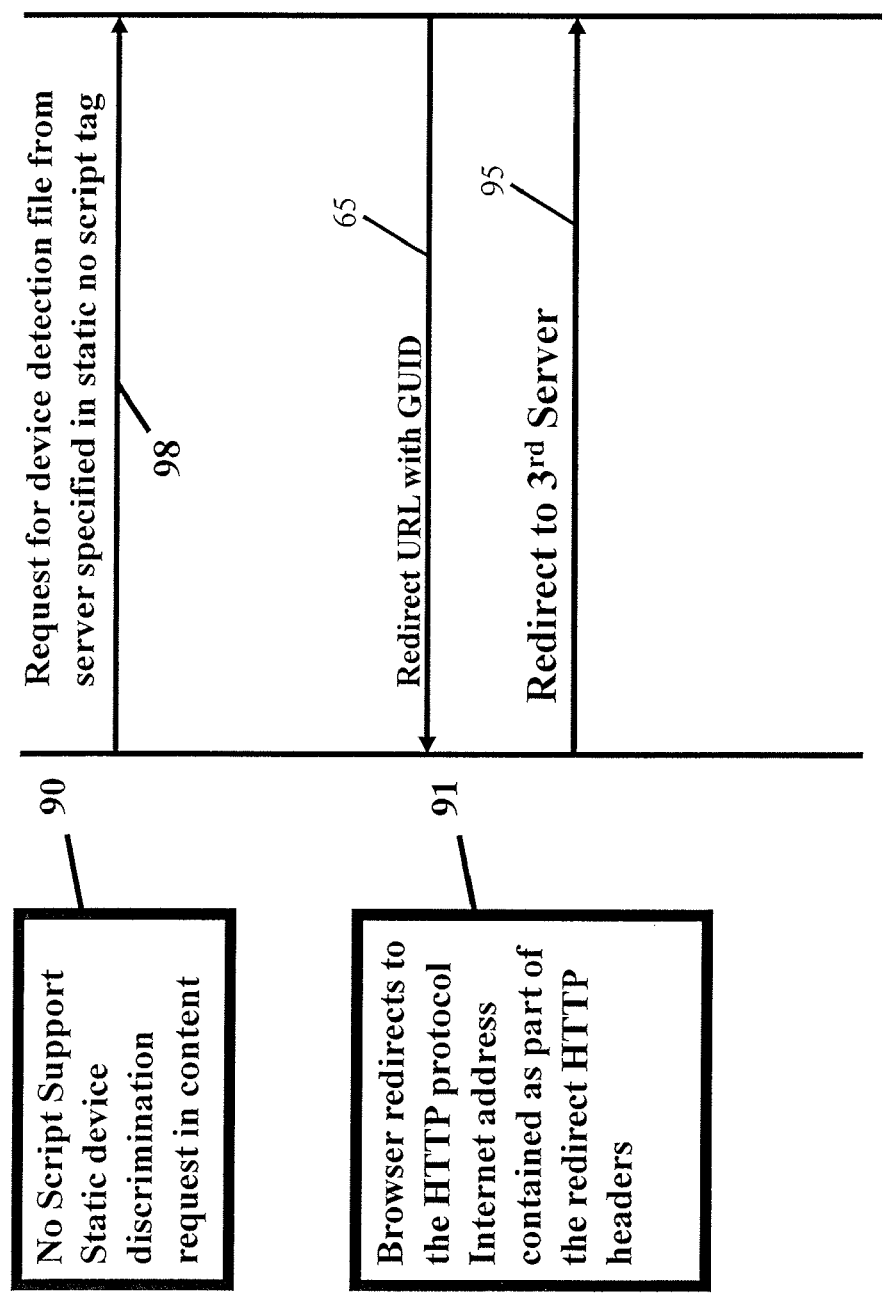

After considering the following description, those skilled in the art will realize the teachings of the present invention can be utilized in any networked client-server environment in which explicitly provided device or user identifying information is not available. Such an environment can encompass the Internet or an intranet, or any client-server environment in which a mobile device browser is used to access and download files through a network communication channel from a server, such as the Mobile Internet. In that regard, the server of the present unique device identification management system can be a separate application, which executes on any computer in the network.

For purposes of simplicity and to facilitate understanding, the present invention is disclosed in the illustrative context of use in uniquely identifying network-distributed devices without the requirement for explicitly provided device or user identifying information. After considering the ensuing description, anyone skilled in the art will readily appreciate how the teachings of the present invention can be easily incorporated into any client-server or other similar distributed processing environment in which a client can encompass not only a specific computer connected to a network, but a software process that possesses network connectivity to another such process and requests information from and, in response, obtains information supplied by the latter.

An overview of the present invention is provided, particularly in the context of its use with a Mobile Internet web browser in a client mobile device, followed by describing each basic component of its implementation.

A. Overview

The present invention accomplishes anonymous unique device identification, in accordance with the broad inventive teachings of the present disclosure, by: downloading code files, e.g., ECMA Script, through a mobile device browser executing at client devices, into browser caches in a manner that is transparent to a user situated at the mobile device browsers; and retrieving device identifying information from 1) the network; 2) the network Internet gateways, and 3) from the client devices themselves. This information is processed in a manner that uniquely identifies anonymous network-distributed devices without requiring explicitly provided device identifying information, for example, a telephone number, or user identifying information, for example, browser side cookies.

Specifically, the technique embodied by the present invention relies on embedding static mark up tags into a content page delivered by a content server 13. These static tags effectively download and instantiate a persistent script in the mobile device browser 7. This script then executes transparently to insert additional mark up in to the content, which subsequently causes the mobile device browser 7 to initiate a request to a Unique Device Identification Management System 400 residing on server 20 in accordance with the present invention.

Figure 2B:
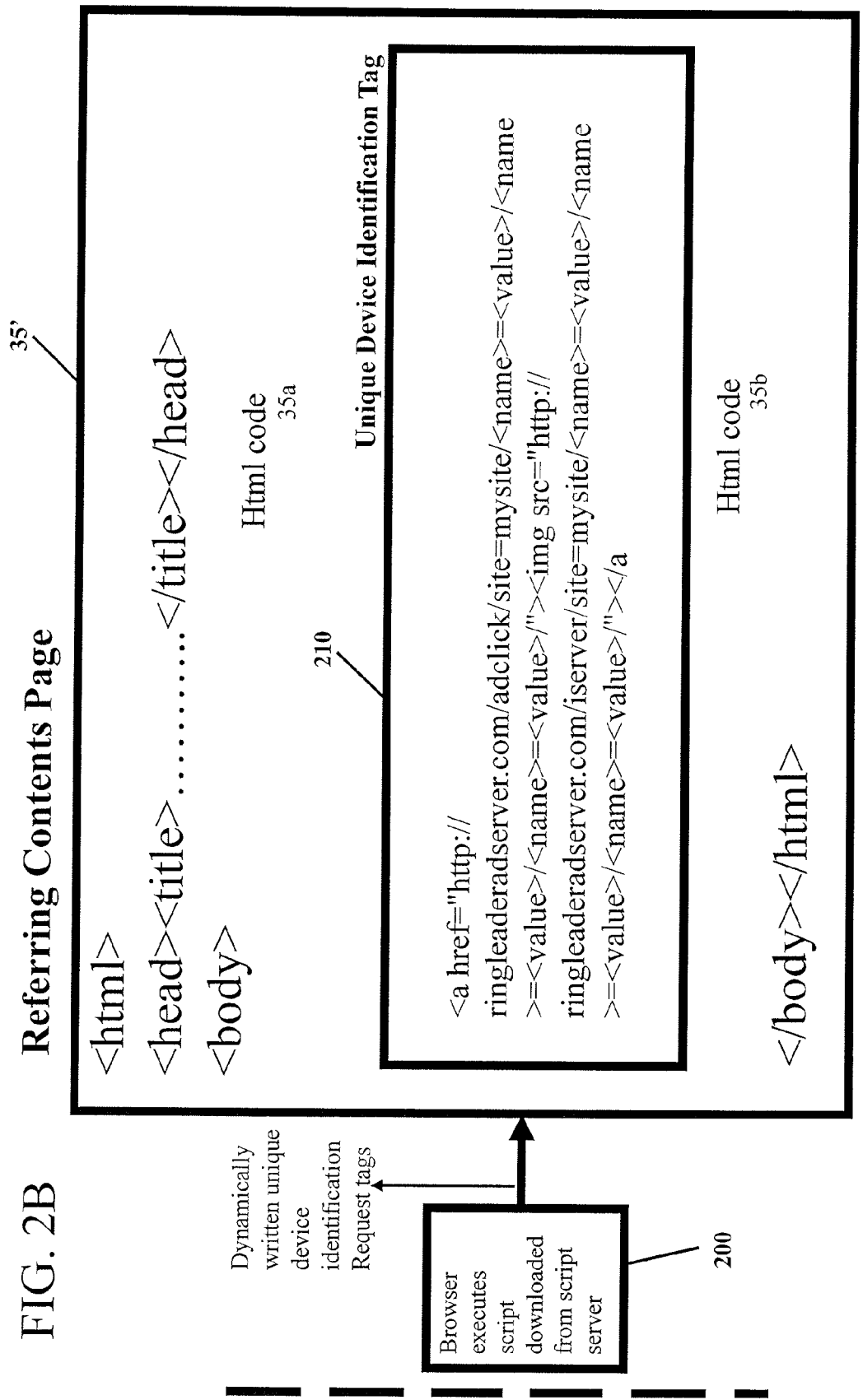

A general deployment of the present invention in an Internet environment is collectively shown in FIGS. 1B and 1C. The correct alignment of the drawing sheets for FIGS. 1B and 1C is shown in FIGS. 1A, that is 1B above 1C. FIGS. 2A and 2B, for which the correct alignment of the drawing sheets for these figures is shown in FIG. 2, collectively depict generalized Mobile Internet page xHTML code which transparently invokes the present invention, and changes which the present invention dynamically makes to the content in order to insert anonymous device unique identification requests to an external Unique Device Identification Management System 400 residing on sever 20 into user requested content. To better understand, FIGS. 1B and 1C, and 2A and 2B should be simultaneously referred to throughout the following discussion.

FIG. 1B and 1C depicts a block diagram of an Internet environment of the present invention.

As shown, client device 5, upon which device browser 7 executes, is connected through communication link 9 to Internet 10. Device browser 7 is a conventional mobile Internet browser, such as the IPhone's Safari or Microsoft's Internet Explorer commercially available from Apple or Microsoft Corporation, respectively. Preferably, for reasons that will shortly become clear, the mobile device browser preferably supports execution of ECMAScript. ECMAScript is a standard script language that is used in Web pages to affect how they look or behave for the user. ECMAScript is object-oriented and conceived as a core language to which can be added the objects of any specific domain or context such as the idea of a "document." Though, for ease of illustrating inter-computer actions, Internet 10 is depicted as having portions 10a and 10b, the present disclosure collectively refers to both portions as simply Internet 10. Web server, or specifically, Mobile Site Content Server 13, connected, via link 11, to Internet 10 represents any web HTTP (hypertext transfer protocol) server commercially available and is accessed via device browser 7 for retrieval of desired content pages in accordance with the present invention. Although it is contemplated a variety of HTTP servers may be used in accordance with the present invention, a preferred embodiment makes use of Microsoft IIS server to compliment the .NET anonymous profiling system made use of by the present system. Web server 13, in response to a request from mobile device browser 7 to fetch a specific file (for example, a content page the user wishes to view), downloads that file, using conventional TCP/IP protocols (transmission control protocols/internet protocols), through the Internet 10 to mobile device browser 7. Mobile device browser 7 will, in turn, render that file typically on a mobile display (for example, via cellular phone) to a user situated at and viewing the client device 5.

Script distribution HTTP server (also referred to as "Script Server") 15 is connected, via communications link 17, to Internet 10 and stores files that collectively implement a predefined script, specifically, an ECMAScript. This script is transparently loaded by the mobile device browser 7 into a local content cache associated with the mobile device browser on client device 5. Script Server 15 downloads the script in a manner to be described below, to client mobile device browser 7. This script, once instantiated and started, then transparently inserts unique device identification requests into the content page, which mobile device browser 7 subsequently executes. Persistent caching of the script advantageously allows execution locally for subsequent content pages, rather than requiring download each time improving performance. The script enables capturing unique device discriminating information from inside the client device 5. The unique device discriminating information is transmitted from mobile device browser 7 to the Unique Device Identification Management System 400.

Unique Device Identification Management System 400 is connected to Internet 10 via communications link 23. In essence and as discussed in detail below, this system, in response to a request originating from the script executing in mobile device browser 7, selects a globally unique device identifier, GUID, for the specific client device 5 if it exists in the database of device profiles maintained by the present system.

HTML tag 40 (which, where necessary, to distinguish this tag from other HTML tags, is referred to hereinafter as a "script tag") is embedded by a content provider(s) into HTML code that constitutes each referring web page, e.g., here content page 35 as shown in FIG. 1A. Generally, the position of this script tag 40 relative to existing HTML code (shown as HTML code portions 35a and 35b in FIGS. 2A and 2B) for this page is not critical.

There are two elements to these script tags 40: An ECMA script element which gets executed if the end-user device supports scripting. Scripts for this implementation are based on the OMA 2006 ECMA Script Standard, V1.0 October 2006, and are fully compliant with the required aspects of that standard. Lastly, a "<noscript> . . . </noscript>" element is embedded in the content which only gets executed if the end-user client device 5 does not support ECMA Script, or if it is not enabled within the client device 5. This implementation ensures whether the client device 5 supports ECMA Script or not, and a unique device identification management system request is always executed in the content page. All elements shown after the "/site=mysite/" directive are the same as one would expect to see for any mobile targeted ad, and these extra targeting values are specified using a name=value virtual directory path format.

The script file can be generated dynamically from the Script Server 15 as shown in FIG. 1B, or alternately delivered as a static file by the Script Server 15. Specifically, scripts can be cached in mobile device browser content caches. Appropriate HTTP headers are dynamically generated in order to ensure a script is only loaded over the network the first time a script is served, if appropriate. Subsequent content page navigation by the user, whether within a session or during subsequent sessions, can be obtained directly from the local content cache. No additional load over the network is required. If the cache is cleared, the process merely repeats to refresh the scripts the next time a unique device identification management system request tag is rendered.

Advantageously, very rarely, if ever at all, do any changes need to be made to these code portions to accommodate the script tag 40. As shown and as reproduced in Table 1 below, coding for implements a script tag in accordance with the present invention.

TABLE 1

SCRIPT AND NO SCRIPT REQUEST TAG

```
<script type="text/ecmascript"
src="http://ringleaderadserver.com/iserver/scriptsite=mediastamp?/site=
mysite/<name> =<value>/<name>=<value>/<name>=<value>/">
</script>
<noscript>
<a href="http://
ringleaderadserver.com/adclick/site=mysite/<name>=<value>/<name>=
<value>/<name>=<value>/"><img src="http://
ringleaderadserver.com/iserver/site=mysite/<name>=<value>/<name>=
<value>/<name>=<value>/"></a>
</noscript>
```

One portion of the advertising tag ("src=http://ringleaderadserver.com/iserver/scriptsite=mediastamp?/site=mysite/<name>=<value>/<name>=<value>/<name>=<value>/"), when executed by mobile device browser 7, downloads a script file from the Script Server 15 as shown in FIG. 1B. This file, in turn, is then interpreted and executed, as a script, by the mobile device browser 7. The effect of executing this script, as symbolized by block 200 shown in FIG. 2B, is to insert unique device identification management system request tags, dynamically written by the script, into the referring web page in lieu of script tag 40 so as to form a modified web page, here referring content page 35', residing in the mobile device browser disk cache. Collectively, these inserted tags form the request to the Unique Device Identification Management System 400, which as those skilled in the art will appreciate, is implemented as a server. This request, as described in detail below and as reproduced in Table 2 below, when interpreted and executed by the mobile device browser 7 initiates an HTTP request to the address specified by the src=portion shown below.

TABLE 2

UNIQUE DEVICE DETECTION REQUEST TAG

```
<ahref="http://dd.ringleaderdigital.com/adclick/SR=1/site=
RLDMS/MOPHAPADFORMAT =MOAGENT/XZ1SITE=RLDMS/
XZ1MOPHAPADFORMAT=MOBANNER">
<img
src="http://dd.ringleaderdigital.com/iserver/SR=1/site=RLDMS/
MOPHAPADFORMAT=MOAGENT/XZ1SITE=RLDMS/
XZ1MOPHAPADFORMAT=MOBANNER"
alt=""/>
```

The present invention allows responding to HTTP unique device identification management system requests from any device browser or device application. It uses "path" information embedded in request URLs to determine which publisher is being served, and in what way. The first-level "directory" in this path generally contains the directive telling the Unique Device Identification Management System 400 in what way to process the request, as in the following example:

http://Server.domain.com/iserver/SITE=YourSite>/
<name>=<value>/<name>=<value>/

In this case, the "iserver" portion tells the ad server to return a response containing a GUID that is appropriate for delivery for publisher "YourSite" and returns it to the mobile device browser as a redirect response to an external server. There are directives that can be used to develop responses appropriate for a variety of service models.

Advantageously, the approach of the present invention provides the flexibility to insert as many request mechanisms as desired from an external ECMA Script file, whose code will be executed during content layout. That code performs any pre-processing or environment detection desired and is transparent to a user.

The one issue in using this form of implementation is that legacy devices not supporting ECMA Script display "no ad". Thus, the present invention is currently prevented from deploying this mechanism as a single cross platform solution at this point in time. Until legacy devices are retired from the market, graceful degradation is accomplished using a separate set of concatenated"<noscript> . . . </noscript>" markup tags. Traditional image requests embedded in click through anchor tags are only executed if a client device does not support the external ECMAScript requests. If a client device does support ECMAScript, the requests between the "noscript" beginning and ending tags are not executed and rendered non-functional.

Different browsers provide different levels of scripting sophistication. Device detection allows customizing scripting functions to accommodate each device's capabilities. Parameters following the "?" query string in the example make up a site's targeting criteria, and is extracted and inserted into the dynamically generated ECMAScript functions. Those script functions generate unique device identification request mechanisms in the device specific to the query site string parameters. Those targets are inserted in the content dynamically when the script is executed inside the device.

If ECMAScript is not supported, or not enabled by the client device, the equivalent of the script dynamically generated ad image and click through ad requests, discussed previously and shown in Table 2, are executed in the "<noscript> . . . </noscript>" tag set. These tags are static and supported across all devices, and provide the mechanism to ensure client side unique device identification management system requests are always executed. ECMAScript provides additional functionality in requests not supported by the "<noscript> . . . </noscript>" tag set, for example local device time zone information.

Now, with the previous explanations in mind and specific reference to FIGS. 1B and 1C, the basic inter-computer actions associated with use of the present invention will now be described, as well as the basic attendant processing steps that occur in the client device.

To begin a browsing session, the user first invokes mobile device browser 7 of client device 5. Once the mobile device browser 7 is executing, the mobile device browser 7 obtains, as an initial web page—selection of this content page being referenced by numeral 31, an address either of a prior so-called "default" content page or a "bookmarked page" previously specified by the user and having its URL stored in the mobile device browser 7 or of a content page manually entered by the user. The mobile device browser 7 of the client device 5 then issues, as symbolized by block 33, a request to fetch a file for that content page 35, with the request 34 containing a URL of that page (i.e., its complete Internet address including its file name). It is assumed for simplicity that the file for that page resides on content server 13. It is also assumed that content page 35 is being requested which will invoke an associated anonymous unique device identification management request in accordance with the present invention. In response to the request routed to content server 13, as symbolized by line 34, this particular server downloads, as symbolized by line 36, to client device 5 a file for content page

35, where the coding stored in this file contains the script tag 40. Illustrative contents of this script tag 40 are shown in dashed block 45, as well as in FIGS. 2A and 2B.

Once this file is received at client device 5 as shown in FIGS. 1B, mobile device browser 7 interprets and then executes, as symbolized by block 52, the HTML code in content page 35, which includes script tag 40 and thus undertakes the actions shown in script download/instantiate/execute operations 50. These operations eventually result in the script tag 40 being downloaded, instantiated and started in the mobile device browser 7 of the client device 5. Generally speaking, the mobile device browser 7 in response to executing the script request tag, issues a request to fetch script, as symbolized by line 54, to the Script Server 15 to download the script. Through various inter-process operations, Script Server 15 accesses and downloads script returned, as symbolized by line 56, the needed file of script to install the unique device identification management request to execute under mobile device browser 7 on the client devices. Once the script file is downloaded to the mobile device browser cache on the client devices, the mobile device browser 7 then instantiates and starts the script executing, as symbolized by block 58.

The script executing at the mobile device browser, 7 in the client device 5, reads from inside the client device 5 additional unique device identification information, such as the client device, clock and time zone settings, any unique device detection cookie values previously set in the client device 5 accessible by the script, as well as information for the version number of the mobile device browser 7 itself, to name a representative sample. These values are appended to the unique device identification management system request Internet URL address as keyword=value parameters. The script then dynamically inserts the direct unique device identification request tags into the HTML code in content page 35, as symbolized by block 58. Generally speaking, the mobile device browser 7 in response to executing the dynamically inserted unique device identification request tags, issues a request for device identification, as symbolized by line 60, to the Unique Device Identification Management System 400, connected through communication link 23 to Internet 10*b*.

Unique Device Identification Management System 400 residing on server 20 is connected, via communications link 23, to Internet 10*b* and stores unique device identifying profiles for client devices previously requesting unique device identification. In essence, and as discussed in detail below, this system, in response to a request dynamically inserted by the script executing in mobile device browser 7, selects a GUID for the specific client device 5 if it exists in the database of unique device profiles 430. It returns a GUID, in a redirect, shown as line 65, to the client device 5 which in turn redirects the GUID to an internet address of a third server using GUID as shown by line 95.

In the case of client device 5 having a mobile device browser 7 not supporting script, block 90 as shown in FIG. 1C is executed by mobile device browser 7 in response to rendering the <noscript> . . . </noscript> tags statically embedded in content page 35. Rather than a request to Unique Device Identification Management System 400 being dynamically inserted into content page 35, the mobile device browser 7 renders the markup embedded between the <noscript> . . . </noscript> tags and issues a request, as symbolized by line 98, to the Unique Device Identification Management System 400 connected through communication link 23 to Internet 10*b*.

In either scenario described above, Unique Device Identification Management System 400 residing on server 20 returns a response redirect to mobile device browser 7, signified as line 65 on FIG. 1C. The GUID matching client device 5, is included as part of the HTTP protocol Internet address included in headers of the redirect response. The mobile device browser 7 then executes the redirect process as signified by block 91 in FIG. 1C, with the GUID transmitted as part of the redirect request signified by line 95 on FIG. 1C to the third server 70 as shown in FIG. 1B.

The present invention enables determining how mobile advertising campaigns perform when viewed by unique visitors. When a first-time visitor accesses a site, that visitor can be associated with a Globally Unique Identifier (GUID) from the Unique Device Identification Management System 400 of the present invention. Using this GUID, ad servers can log impressions served to unique visitors and clicks performed by the unique visitor. In one embodiment, this GUID can be passed from the Unique Device Identification Management System 400 of the present invention in real time to external systems, such as agency dashboard audit systems, as a query string following the "?" redirect to creative in those systems, as shown in the example 1 directly below, or as a keyword=value targeting parameter contained in the path portion of the redirect URL shown in Example 2.

http://eyeblaster.com/creative.gif?GUID=6723591

EXAMPLE 1

GUID Passed to External System in Redirect from Mobile Device Browser as Part of "?GUID=6723591" Query String Shown Above http://eyeblaster.com/GUID=6723591/

EXAMPLE 2

GUID Passed to External System from Mobile Device Browser as Part of "?GUID=6723591"0 Redirect URL Path Address As those skilled in the art will appreciate, an agency dashboard audit system is a buy side tool. Examples of which are DART, Eyeblaster, and Microsoft Atlas Media Console. Advertisers use those tools to manage online advertising campaigns that can cut across digital channels. They usually serve the creative and track the advertisers campaign across multiple sites. The tools provided these companies are often called dashboards and allow advertisers and themselves to monitor how campaigns are progressing in terms of number of unique users consuming the advertising when they visit a sites content, impressions delivered in total and by site as well as click throughs by users, ROI, etc. Thus the focus of an agency dashboard audit system is on the advertiser, not the publisher, and provides a real time reporting and metrics dashboard to monitor how advertising campaigns for the brand and advertiser are doing. Those systems have the final determination on what publishers get paid and thus act as the audit for counting metrics of a campaign. Generally, sites get a certain cost per thousand ads delivered to their content audience, and thus these agency dashboard audit systems are also used to check discrepancies between what the publisher said was delivered and what actually got counted as delivered to the actual user, and they are ultimately responsible to the advertiser as to the performance of their campaigns.

B. Client Device

Figure 3:
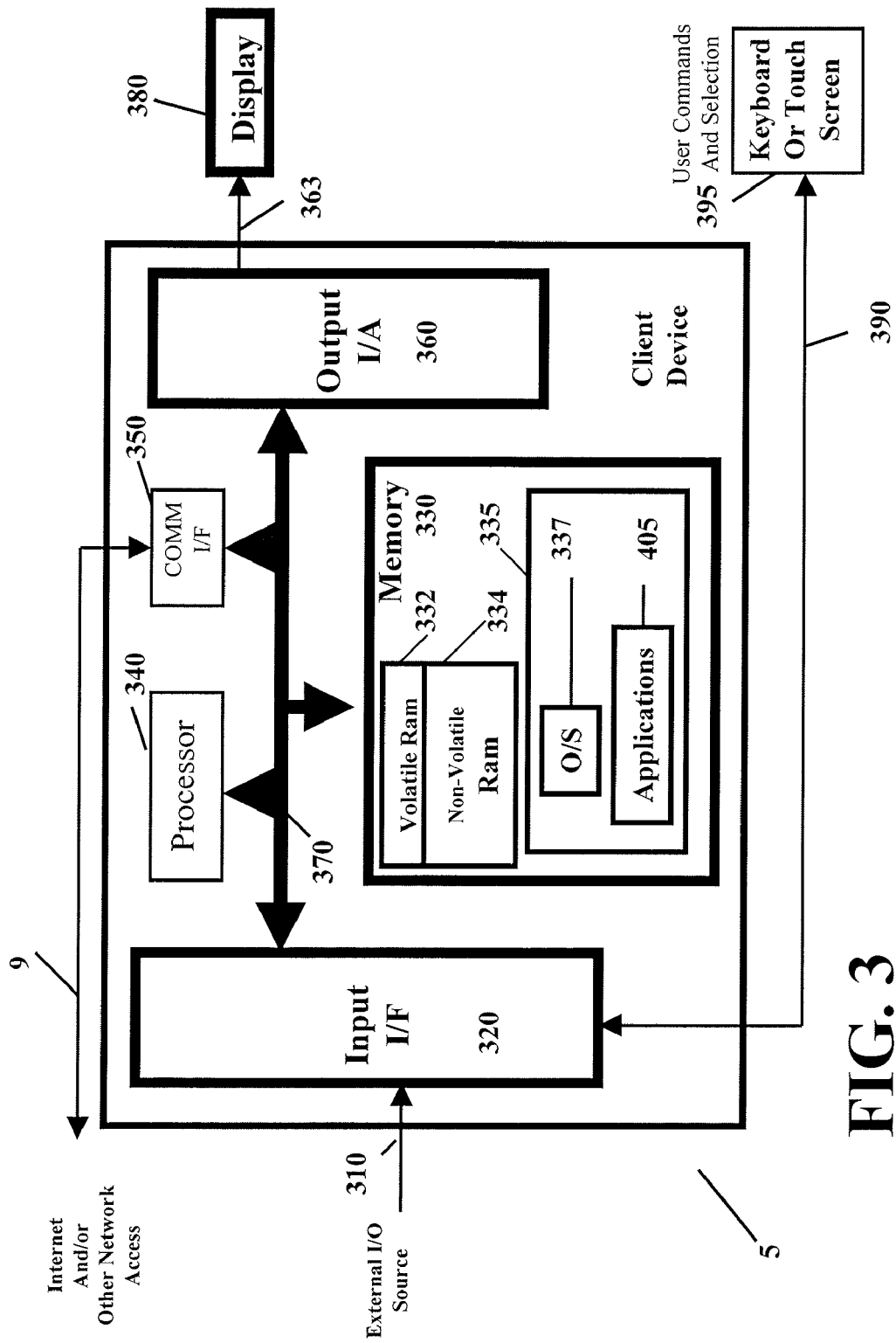
FIG. 3 depicts a high-level block diagram of client device 5 shown in FIGS. 1B and 1C.

FIG. 3 depicts a block diagram of a client device 5. The client device 5 comprises input interfaces (I/F) 320, processor 340, communications interface 350, memory 330 and output interfaces 360, all conventionally interconnected by bus 370. Memory 330, which generally includes different modalities including illustratively random access volatile memory (RAM) 332 and non-volatile RAM 334 for temporary data and instruction store, and non-volatile memory 335 that is implemented using persistent static memory. The non-volatile memory 335 stores operating system (O/S) 337 and application programs 400, the latter illustratively contains mobile device browser 7 (see, e.g., FIGS. 1B and IC). O/S 337 may be implemented by any conventional mobile operating system, such as the Apple Mobile O/S, Windows Mobile 5 or 6 Operating system ("Windows Mobile 5", "Windows Mobile 6" are trademarks of Microsoft Corporation of Redmond, Wash.). Given that, a detailed discussion of the components of O/S 337 is not provided herein and are well known to those skilled in the art. Suffice it to say, that the mobile device browser, being one of the application programs 405, executes under control of the operating system.

Incoming information can arise from two illustrative external sources: network supplied information, e.g., from the mobile Internet and/or other networked facility, through communication link 9 to communications interface 350, or from a dedicated input source, via path 310, to input interfaces 320. Dedicated input can originate from a wide variety of sources, e.g., an external USB port or proprietary interface connecting Apple's IPhone to a computer for loading applications into it using Apple's ITunes storefront computer application. Input interfaces 320 contain appropriate circuitry to provide necessary and corresponding electrical connections required to physically connect and interface each differing dedicated source of input information to client device 5. Under control of the O/S 337, application programs 400 exchange commands and data with the external sources, via network connection 9 or path 310, to transmit and receive information typically requested by a user during program execution.

Input interfaces 320 also electrically connect and interface user input device 395, such as, a keyboard or touch screen, to client device 5. Display 380, such as a conventional liquid crystal color panel, is connected via leads 363 to output interfaces 360. The output interfaces 360 provide requisite circuitry to electrically connect and interface the system.

Furthermore, since the specific hardware components of client device 5, as well as all aspects of the software stored within memory 335, apart from the modules that implement the present invention, are conventional and well-known, they will not be discussed in any further detail. Generally speaking, the Script Server 15 and Unique Device Information Management System 400 as shown in FIG. 1B each have an architecture that is quite similar to that of client device 5 with the addition of a local magnetic disk for persistent software and data storage.

C. Unique Device Identification Management System Software

Figure 4:
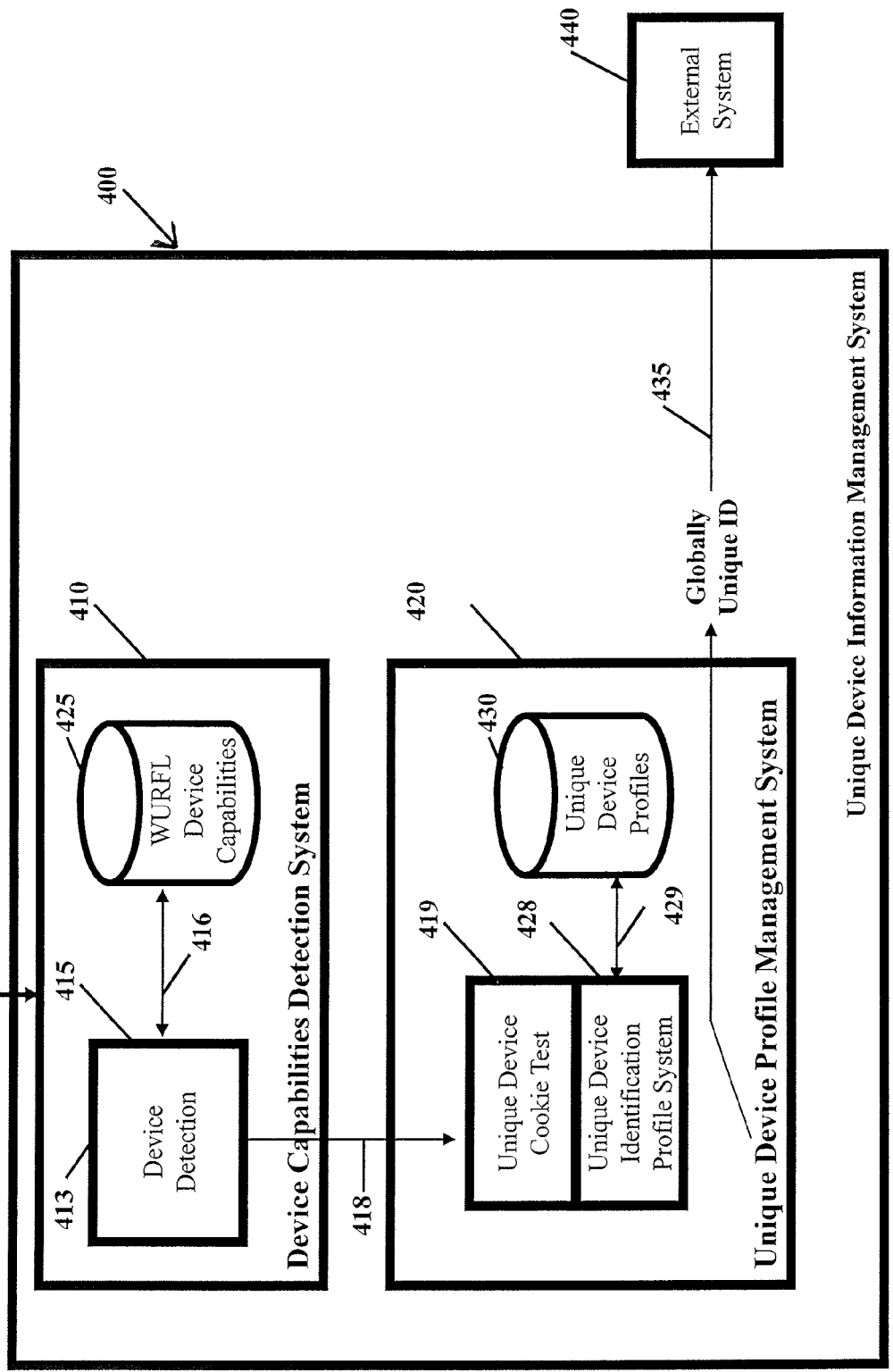
FIG. 4 depicts a simplified high-level block diagram of the Unique Device Information Management System 400, resident within the server device 20 shown in FIG. 1B.

FIG. 4 depicts a simplified high-level device capabilities detection system diagram of the Unique Device Identification Management System 400 discussed above.

1. Unique Device Identification Management System 400

As shown, the system contains a device capabilities system, shown as device capabilities detection system 410, and a Unique Device Profile Management System 420. The device identification request HTTP header information received at 401 from mobile device browser 7 of FIG. 1B, contains device specific parameters, for example the device manufacturer and model, as well as parameter=value properties determined by the script processing 50 of FIG. 1B, in the HTTP address for the Unique Device Identification Management System 400.

The device capabilities detection system 410, in this embodiment, uses the open source WURFL software, which is a database of device capabilities along with a large variety of application programming interfaces. "WURFL stands for Wireless Universal Resource File. It is part of a FOSS (which stands for Free and Open Source Software) community effort focused on the problem of presenting content on the wide variety of wireless devices. The WURFL itself is an XML configuration file which contains information about device capabilities and features for a variety of mobile devices. Device information is contributed by developers around the world and the WURFL is updated frequently reflecting new wireless devices coming on the market. Luca Passani is the driving force behind WURFL." http://en.wikipedia.org/wiki/WURFL. Each unique device in the WURFL database contains a device identifying user-agent string associated with information identifying the capabilities and features of many mobile devices. WURFL is deployed at carriers and portals around the globe and is documented at http://wurfl.sourceforge.net/. Additionally, a number of commercially available implementations with value added features are available from vendors such as Ripcode.

Appropriate HTTP protocol headers received at device capabilities detection system 410 in FIG. 4, with the unique device identification management system request from mobile device browser block 7 in FIG. 1B, signified by line 401 in FIG. 4, is used by the WURFL system to extract capabilities specific to the requesting device manufacture and model and insert them as /capability=value/ pairs in the outgoing HTTP request to the Unique Device Profile Management System 420 in FIG. 4.

A typical request URL followed by its associated HTTP trace is shown in Table 3 directly below:

TABLE 3 http://core.ringleaderdigital.com/site=msn/random=1553481/
HTTP/1.1 302 Found
Date: Thu, 16 Jul 2009 11:15:24 GMT
Server: Microsoft-IIS/6.0
X-Powered-By: ASP.NET
X-AspNet-Version: 2.0.50727
Location: http://core.ringleaderdigital.com/site=msn/random=1553481/
Set-Cookie: MoPhapCookie=7d646760-ce87-437b-b954-82f2bd1380f7;
expires=Sat, 16-Jan-2010 12:15:24 GMT; path=/
Cache-Control: private
Content-Type: text/html; charset=utf-8
Content-Length: 274
Connection: Keep-Alive Device specific configured values are appended to the incoming path portion by device capabilities detection system 410, HTTP request, signified by line 401, with a typical output request URL followed by its associated HTTP trace shown in Table 4 below. In accordance with a preferred embodiment, the device capabilities detection system 410 appends client device 5 capabilities as /keyword=value/ pairs to the incoming Internet address URL received from the mobile device browser 7 for the requesting client device 5 and then redirects the request to the Unique Device Profile Management System 420.

The expanded path is communicated to the Unique Device Profile Management System 420. This system is commercially available as well as available open source and will not be discussed further. For the purposes of implementing the present system, the "WURFL" system is used as the open source device detection example, and RipCode's TransAct Detector device detection system is used as an example of a commercial product, i.e., http://www.ripcode.com/products/detector.php. It is treated as a black box turn key system which provides device identification discriminators based on client device capabilities for a specific model and manufacturer device, as well as the lookup translation of incoming IP host address to carrier IP block. Each carrier is assigned one or more blocks of IP addresses unique to them, and that is appended to the outgoing URL virtual directory path as "/carrier=stringvalue/"

TABLE 4 http://rld.ringleaderdigital.com/iserver/AAMGNRC1=UNK/AAMGNRC2=GENERIC
WEB BROWSER/AAMGNRC3=4/aamsz=banner/AUDIO=TRUE/BRWSR=UNK/
CARRIER=UNK/CC IP=UNK/CITY IP=UNK/DEV OS=WINDOWS NT/
DEVICE=GENERIC WEB BROWSER/ECMA=TRUE/GUID=da3ad1cf-7967-4ffc-ae01-
06f8f669f530/JAVA ME=FALSE/keyword=ebsato20090622t/PM=TOUCHSCREEN/
QWERTY=TRUE/random=1553481/REGION IP=UNK/SCRNHEIGHT=300/
SCRNWIDTH=770/site=msn/STREAM=TRUE/VIDEO=TRUE
HTTP/1.1 302 Found
Date: Thu, 16 Jul 2009 11:15:26 GMT
Server: Microsoft-IIS/6.0
X-Powered-By: ASP.NET
X-AspNet-Version: 2.0.50727
Location:
http://rld.ringleaderdigital.com/iserver/AAMGNRC1=UNK/AAMGNRC2=GENERIC
WEB BROWSER/AAMGNRC3=4/aamsz=banner/AUDIO=TRUE/BRWSR=UNK/
CARRIER=UNK/CC IP=UNK/CITY IP=UNK/DEV OS=WINDOWS NT/DEVICE=GENERIC
WEB BROWSER/ECMA=TRUE/GUID=da3ad1cf-7967-4ffc-ae01-
06f8f669f530/JAVA ME=FALSE/keyword=ebsato20090622t/PM=TOUCHSCREEN/
QWERTY=TRUE/random=1553481/REGION IP=UNK/SCRNHEIGHT=300/
SCRNWIDTH=770/site=msn/STREAM=TRUE/VIDEO=TRUE
Cache-Control: private
Content-Type: text/html; charset=utf-8
Content-Length: 530
Connection: Keep-Alive 2. Unique Device Cookie Test 419

GUID cookies of the present Unique Device Identification Management System 400, if enabled and supported by client device 5, shown in FIG. 1B, are automatically transmitted by the mobile device browser 7, shown in FIG. 1B, in the standard HTTP Internet protocol cookie header, received at device capabilities detection system 410 as signified by line 401 in FIG. 4. That cookie information is delivered to the Unique Device Profile Management System 420 shown as line 418, on FIG. 4, where it is executed by the unique device cookie test 419. The detailed processing for the unique device cookie test 419 is described in detail subsequently.

3. Unique Device Profile Management System 420

The Unique Device Profile Management System 420 receives the HTTP request from the device capabilities detection system 410 using a server-to-server redirect signified by communication channel 418. The Unique Device Identification Profile System 428 parses the device discrimination keyword=values from the requesting URL, as well as captures all the HTTP protocol headers and any browser cookies and stores them in an existing profile in the Unique Device Profiles database 430 using the database communication channel 429, if the device has requested unique device identification request in the past. The profile corresponding to this device profile, has its GUID retrieved, and that is appended to the previous keyword=values from the requesting URL path, and redirected back to the 3$^{rd}$ server address 70 in FIG. 1B via the originating mobile device browser 7 of client device 5.

If this is the first time the client device 5 has made a unique device identification request, a new globally unique identifier is generated and it and all the HTTP protocol headers and values, as well as the incoming URL "/keyword=value/"s via path 418, are stored in its newly assigned profile in the Unique Device Profiles database 430. The device profile GUID is appended to the previous keyword=values from the requesting URL path, and redirected back to the 3$^{rd}$ server address 70 in FIG. 1B via the originating device browser 5.

In accordance with a preferred embodiment, and as discussed below with reference to FIG. 7, the Unique Device Profile Management System 420 receives an Internet HTTP request and retrieves a pre-configured hierarchical list of request HTTP protocol headers names and their values as "property=value" triplets. The Unique Device Profile Management System 420 parses the client device capabilities and client device identifying "/keyword=value/" parameters from the incoming Internet address path portion of the request URL as "property=value" triplets and persistently stores all "property=value" triplets in a profile assigned to the client device by the Unique Device Profile Management System 420 in a the unique device profile database 430.

A pre-configured hierarchical list of a subset of all "property=value" triplets stored in each client device profile are retrieved for a current profile assigned to the incoming mobile device browser request and all client device profiles existing in the database that match the value of the first highest weight "property=value" triplet in the pre-configured hierarchical list in the current request profile are retrieved. The Unique Device Profile Management System 420 then sequentially eliminates profiles not matching each "property=value" triplet in the list until a single profile is left or all "property=value" triplets have been used. If a single profile is left, that profile is identified as the current requesting client device profile updated in the database from a previous request from the same client device.

If after eliminating profiles more than one profile is left, the current requesting device profile is compared against each remaining client device profile matching all hierarchical list of a subset "property=value" triplets using Tanimoto similarity correlation. If a single remaining device profile matching all hierarchical list of a subset "property=value" triplets is below a predefined Tanimoto similarity coefficient threshold when compared with the current requesting profile, that profile is identified as the current requesting client device profile updated in the database from a previous request from the same client device. A response to the originating client device, with the globally unique identifier associated with the client device in the device profile management database is embedded in the response and returned to the mobile device browser originating the unique device identification request. If no remaining client device profiles matching all hierarchical list of a subset "property=value" triplets is below a predefined Tanimoto similarity coefficient threshold when compared with the current requesting profile, the current profile is identified as a first time request from the unique client device and is saved in the database as a new device profile. A response is sent to the originating client device, with the globally unique identifier associated with the client device in the device profile management database embedded in the response and returned to the mobile device browser originating the unique device identification request.

In accordance with an alternate embodiment, a pre-configured hierarchical list of a subset of all "property=value" triplets stored in each client device profile are retrieved for a current profile assigned to the incoming mobile device browser request and all client device profiles existing in the database that match the value of the first highest weight "property=value" triplet in the pre-configured hierarchical list in the current request profile are retrieved. The Unique Device Profile Management System 420 then sequentially eliminates profiles not matching each "property=value" triplet in the list until a single profile is left or all "property=value" triplets have been used. Thereafter, all device profiles existing in the database are retrieved that match the value of the first "property=value" triplet of the current request profile, and the Unique Device Profile Management System 420 sequentially eliminates profiles not matching each "property=value" triplet in the list until a single profile is left or all "property=value" triplets have been used. If zero remaining client device profiles matching all hierarchical list of a subset "property=value" triplets remain, the current profile is identified as a first time request from the unique device and is saved in the database as a new device profile. A response is sent to the originating client device, with the globally unique identifier associated with the client device in the device profile management database embedded in the response and returned to the mobile device browser originating the unique device identification request.

Figures 5, 5A:
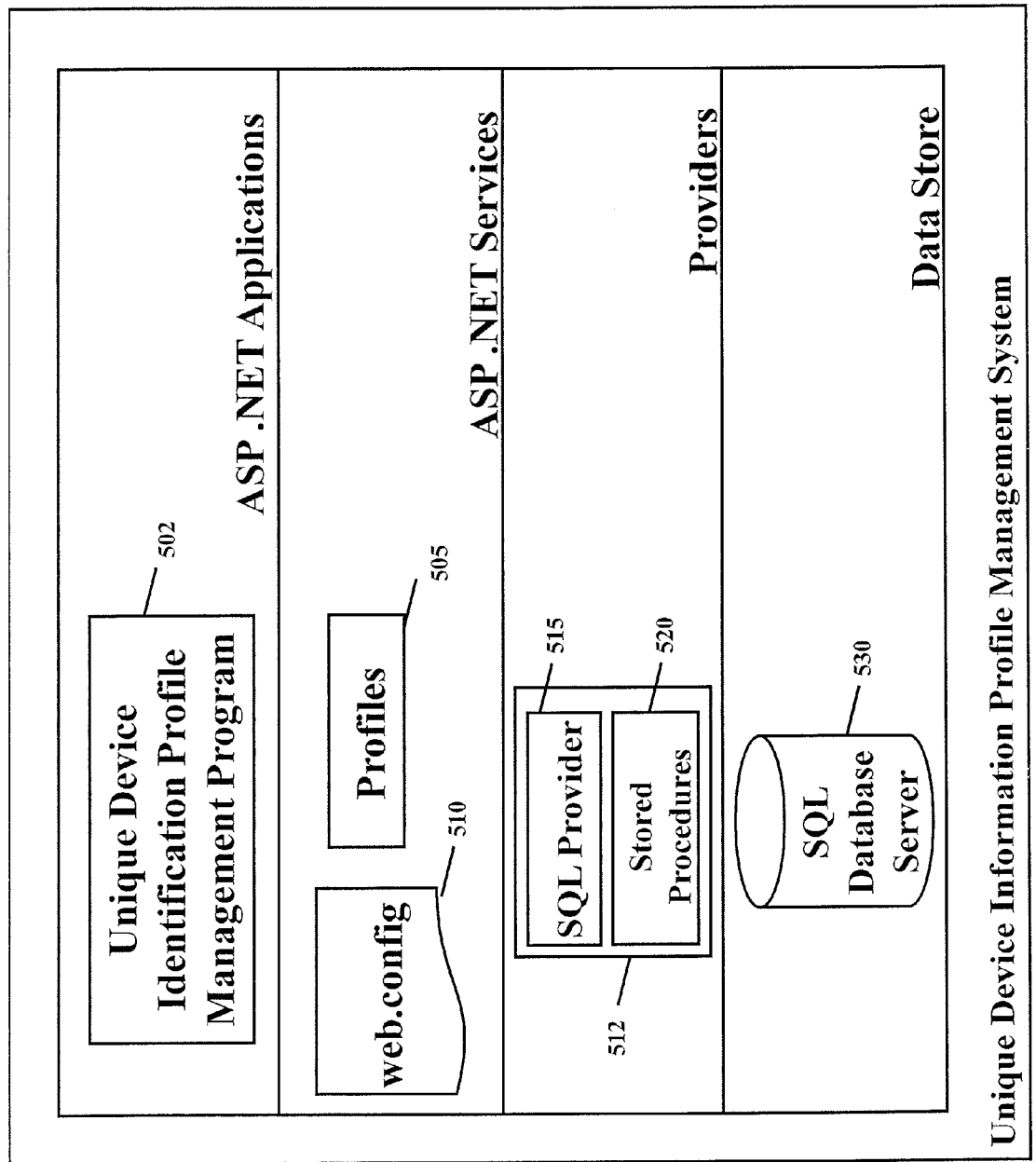

FIG. 5A depicts a simplified block diagram, 500, of the Unique Device Profile Management System 420 in FIG. 4, and FIG. 5B shows the unique device identification system profile properties section within a .NET web.config.

Though any number of server side data store technologies could be applied, the preferred embodiment leverages the Microsoft .NET Anonymous Profiling system as the proxy facilities that implement the unique device profile storage. That system, built into the .NET framework, stores strongly typed per-user data, serialized persistently and supports on-demand lookup for both authenticated and anonymous users. The Profile feature in ASP.NET allows developers to specify per-user settings or data, using an application web.config file, represented as file 510 in FIG. 5A, which can be stored in an anonymous profile 505 so that settings can be retrieved without requiring the user to log into the site. Microsoft created a provider model where the profiling service is provided by a pre-installed class or set of classes 512. Providers are a class with a well-known interface that is implemented to meet the needs of the sub-system. For example, a Profile provider is a class that derives from the .NET abstract "ProfileProvider" class. This class provides abstract methods and properties that make up the interface for a Profile provider, shown as block 520.

Furthermore, this system supports custom data base providers; however the standard default provider is used in this embodiment and implements a stored procedure parameter search capability native to Microsoft SQL Database Server 530 in FIG. 5A. Details for implementing Microsoft's .NET Anonymous Profiling System reside at http://msdn.microsoft.com/en-us/library/ewfkf772.aspx.

Figure 6:
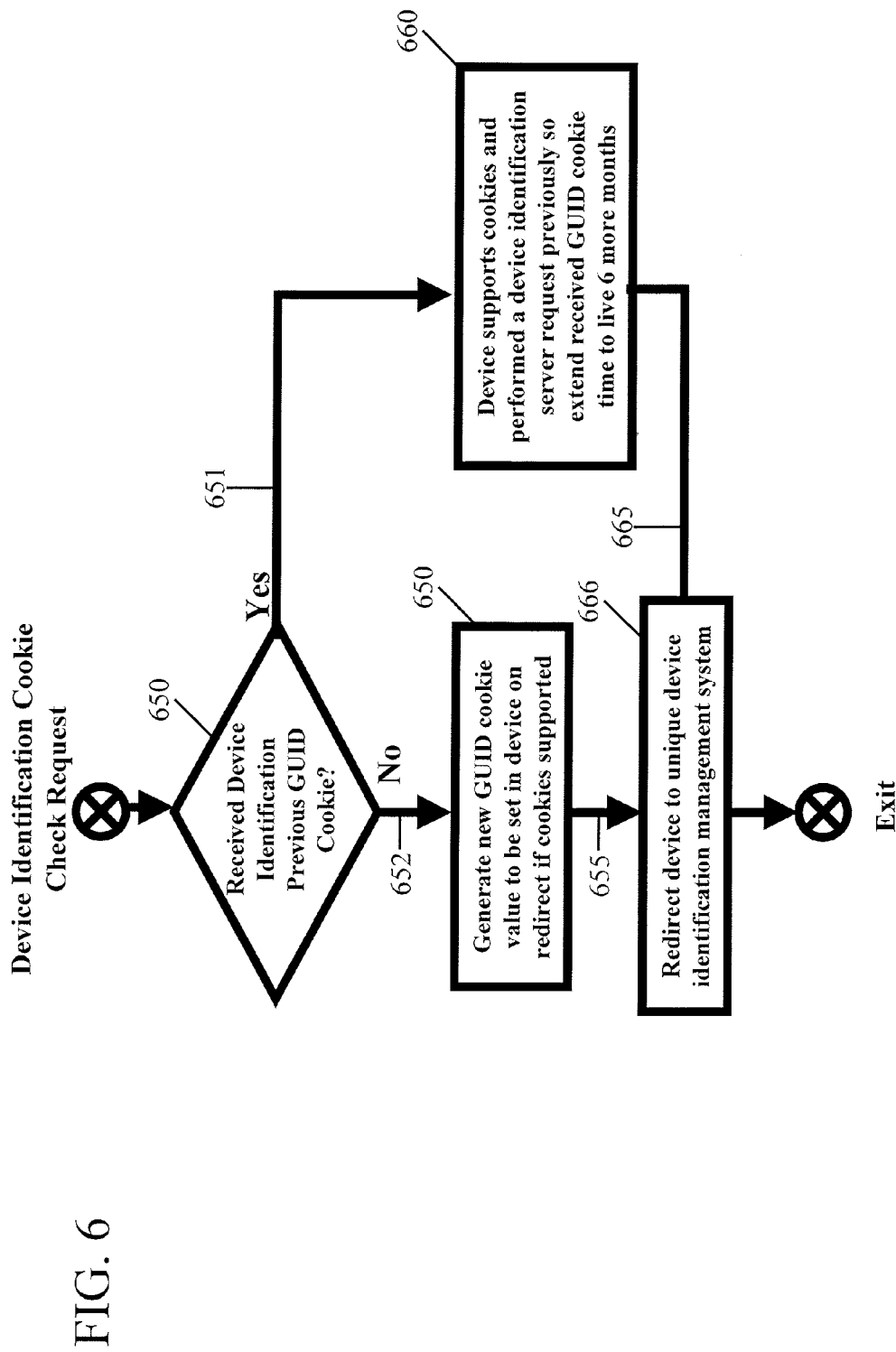
FIG. 6 depicts a high-level flowchart of processing operations 502 on FIG. 5A, performed by the Unique Device Identification Cookie Test Flow Chart.

FIG. 5B shows an actual profile properties section within a .NET web.config used to specify device profile property names and default values. Properties consist of name/type pairs and will basically become the schema under which the personalization data will be stored. By default, profile properties are only available for authenticated users. In order to make them available for an anonymous user, allowAnonymous="true" is added to the property. Without the attribute, the runtime will throw an exception if the current user is anonymous and one writes to the property. Properties are defined using <add> elements within a <properties> element. Implementation details can be found at http://msdn.microsoft.com/en-us/library/system.web.profile.profilemigrateeventargs.anonymousid.aspx FIG. 6 depicts a high-level flowchart of processing operations Unique Device Identification Profile management Program 502 on FIG. 5A, performed by the Unique Device Profile Management System 420, shown in FIGS. 5A. Decision block 650 is invoked when a unique device identification request is received from mobile device browser 7 represented in FIG. 1B, and it tests whether the mobile device browser 7 transmitted a Unique Device Management System globally unique identifier cookie previously set in the device during a previous Unique Device Identification Management System request. The cookie is automatically transmitted by the mobile device browser 7 shown in FIG. 1B, in the standard HTTP Internet protocol cookie header, received at device capabilities detection system 410 as signified by line 401 in FIG. 4. That cookie information received in the standard HTTP protocol header is delivered along path 418 to the Unique Device Profile Management System 420 shown in FIG. 4, where it is executed by the unique device cookie test block 428.

In a first scenario, as signified by the YES path, 651, processing block 660 is executed signifying the device mobile device browser 7 does support cookies and performed a device identification server request previously and it copies the received GUID cookie to the request response and extends the time to live 6 more months. It then invokes processing block 666 for redirecting the client device 5 to the Unique Device Identification Management System 400 residing on server 20, via execution path 665.

In a second scenario, as signified by the NO path, 652, processing block 650 is executed signifying the device mobile device browser 7 either does not support cookies or is a first time request from client devices that do support cookies. Block 650 generates a new GUID and copies the new GUID into the named cookie header assigned for use by the Unique Device Identification Management System 400. The value is inserted into the request response and its time to live set to 6 more months. It then invokes processing block 666, via execution path 655. Processing block 666 then performs a .NET "Response.Redirect" system call to the Internet address of Unique Device Identification Management System 400 residing on sever 20 shown in FIG. 1B.

Figure 7:
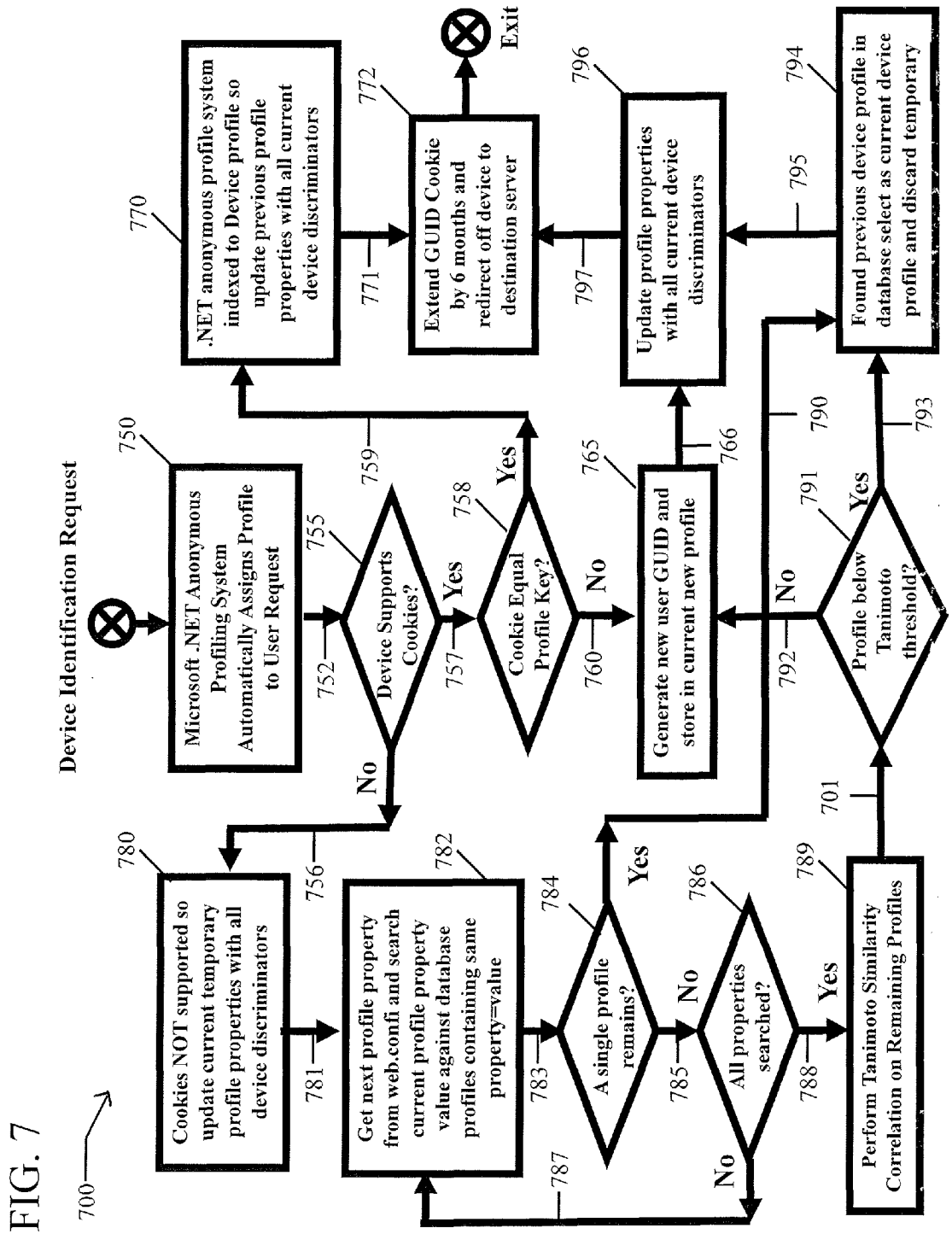
FIG. 7 depicts a flowchart of the Unique Device Identification Request Flow Chart 700, shown in block 420 of FIG. 4.

FIG. 7 depicts a high-level flowchart of processing operations 700 performed by the Unique Device Profile Management System 420, shown in FIG. 4. Upon entry into operations 700, which occurs in response to a device profile management event (that is, the transmission of a request from the device capabilities detection system 410 to the Unique Device Profile Management System 420 along path 418) shown in FIG. 4 produced by the Device Capabilities Detection System, the unique device identification profile system 428 performs its function. More specifically, the unique identification profile system 428 initializes the Unique Device Identification Profile Search. This includes reading any unique device identification browser resident cookies from the HTTP protocol headers received with the Unique Device Identification Request, shown as event 401 in FIG. 4.

Though any number of server side data store technologies could be applied, an implementation is disclosed that uses the Microsoft .NET Anonymous Profiling system as the proxy facilities that implement the mobile server unique device identification management system storage. That system, built into the .NET framework, stores strongly typed per-user data, serialized persistently and supports on-demand lookup for both authenticated and anonymous users. The profile feature in ASP.NET allows developers to specify per-user settings or data, which can be stored in an anonymous profile so that settings can be retrieved without user login.

Microsoft has created a provider model where the profiling service is provided by a class or set of classes. Providers are a class with a well-known interface that is implemented to meet the needs of the sub-system. For example, a Profile provider is a class that derives from the .NET abstract "ProfileProvider" class. This class provides abstract methods and properties that make up the interface for a Profile provider. Furthermore, this system supports custom data base providers, which can be used to implement an optimized stored procedure parameter search capability that allows the system to scale as more and more user profiles are accumulated. For this embodiment, the standard provider delivered by default in the .NET framework is used.

As explained previously, all HTTP headers received with a request are transparently provided to the Unique Device Profile Management System 420 using a .NET ASP application "Server.Transfer" capability. The built in .NET function allows all of the current contents for the HTTP request collections received by the .NET application, Capabilities Detection System (or unique device identification profile system 428) as shown in FIG. 4, to be made available to the second .asp program, Unique Device Profile Management System 420, that is receiving the transfer. Once this occurs, block 750 tests for receipt of previously set user identification management system cookies. If cookies are received, decision block 755 routes execution, via YES path 757, to decision block 758.

Decision block 758 tests for receipt of previously set user identification management system cookies. If cookies are received, decision block 758 checks the cookie value against the current Microsoft Anonymous Profile name, i.e., the primary key for the database profile. A match indicates the current profile for the specific requesting device was automatically retrieved by that .NET system. In this case, decision block 758 routes execution, via YES path 759, to block 770. This block 770 updates the device profile with all current device identifying values, examples of which are described in a later section, and then saves the updated profile to the database with the new values. These updated values provide information collected over multiple requests that can be used to monitor behavior over time, e.g., a list of sites visited and the context contained in the content pages consumed by the user, for example, deliver context advertising to a $3^{rd}$ server 70 as shown in FIG. 1B.

Upon completion, block 770 invokes block 772, via execution path 771. Processing block 772 configures the HTTP response to the originating unique device identification request, shown as event 401 in FIG. 4, to extend the mobile device browser 7, time to live value of the GUID cookie by 6 months. In particular, if the client device 5 supports the writing and reading of cookies, the present system will store the GUID from the system into a cookie when an ad is served. If the client device 5 supports cookies, the cookie will automatically be transmitted in an HTTP cookie header with any subsequent ad request to the present system from the client device 5. That cookie value is the direct index to that device profile within the database of unique device profiles 430, and no search through the database is required to find the client device's profile since its associated profile is directly accessed from the database by the GUID cookie which serves as a primary key to the profile. A time to live value is specified during the ad deliver to extend the previously stored cookies valid lifetime.

Additionally the GUID is read from the device profile in unique device profiles database 430 of FIG. 4. Additionally, the GUID value is appended to the incoming request path portion 418 of the Unique Profile Management System Internet address URL, and performs a .NET "Response.Redirect" system call to the Internet address of $3^{rd}$ server 70.

The redirect response is received at the originating client device 5, mobile device browser 7 in FIG. 1B. The standard HTTP protocol handler in the mobile device browser interprets the redirect response and issues a request to the redirect address contained in the HTTP protocol redirect address header, which contains the GUID as the last keyword=value pair in the address, or alternatively passed as part of the query string, i.e., "uid=da3ad1cf-7967-4ffc-ae01-06f8f669f530/" portion of the URL shown immediately below:

http://mbs-dev.serving-sys.com/BurstingPipe/adServer.bs?cn=mb&c=26&pli=414956&pi=0&f=5&uid=da3ad1cf-7967-4ffc-ae01-06f8f669f530&ord=1079662023&on=UNK&dvc=GENERIC WEB BROWSER&s=4

In the case of a device supporting cookies as signified by decision block 755 executing the YES path 757, but a unique device identification system cookie was not contained in the HTTP request, as signified by decision block 758 routing execution via NO path 760, to block 765, a first time unique device identification request was received from this specific client device 5 shown in FIG. 1B. In this scenario, a temporary profile was assigned to the request by Microsoft's .NET Anonymous Profiling system and block 765 processing will save the profile name, i.e., its primary database key, as the GUID assigned to the unique device. Upon completion, block 796 is invoked by execution path 766. Block 796 is responsible for updating the current new device profile with all device identifying values contained in the transmission of a request at 418 received by unique device identification profile system 428 shown in FIG. 4, examples of which are described in a later section, and then saves the populated profile to the database with the device discriminating values.

Upon completion, block 796 invokes block 772, via execution path 797. Processing block 772 configures the HTTP response to the originating unique device identification request, shown as event 401 in FIG. 4, to set the mobile device browser time to live value of the new profile GUID cookie to 6 months. Additionally the GUID is read from the device profile in database 430 of FIG. 4. This GUID value is appended to the incoming request path portion 418 of the Unique Profile Management System Internet address URL, and performs a .NET "Response.Redirect" system call to the Internet address of $3^{rd}$ server 70 as shown in FIG. 1B. The redirect response is received at the originating mobile device browser 7 of client device 5 as shown in FIG. 1B. The standard HTTP protocol handler in the mobile device browser 7 interprets the redirect response and issues a request to the redirect address contained in the HTTP protocol redirect address header, which contains the GUID as the last keyword=value pair in the address, or alternatively passed as part of the query string, i.e., "?GUID=value" portion of the URL shown below.

This processing scenario just described ensures the next request to the Unique Device Identification Management System 400, which includes the GUID, gets passed in the associated browser cookie along with the HTTP request, which will automatically retrieve the client device profile using the automatic Microsoft Anonymous Profile .NET system requiring no search of the database to find the profile.

Decision block 755, as previously described, tests whether the mobile device browser 7 as shown in FIG. 1A, supports the setting and transmission of cookies to a server. In this scenario, as signified by the NO path 756, either the client device 5 does not support or has been configured not to allow persisting server browser cookies. Alternatively, the carrier's Internet gateway may filter out device browser cookies to prevent them from being set or passed to the Internet server. In which case, block 780 is invoked; signifying cookies cannot be set or read by the Unique Device Identification Management System 400. In this case non-cookie discriminating information is received with the request from mobile device browser 7 as shown in FIG. 1B. This information is saved in the temporary profile automatically assigned by the Microsoft .NET Anonymous Profile system. Without the ability to set cookies in the mobile device browser 7 by Microsoft's .NET Anonymous Profile system, each request will have a newly assigned current profile that will be populated with all received device information by block 780.

Once block 780 processing has completed, execution will be transferred to block 782 by execution path 781 where the next profile property is obtained and current profile property values are searched against profiles maintained in the unique device profiles database 430. Until either a single existing profile previously stored in the unique device identification management system profile database 430 is found to match the temporary current profile in terms of discriminating information, execution loops back, via NO path 787 until all discriminating individual parameters have been tested, the list which is contained in the .NET application "web.config" file shown in FIG. 5B. Not every parameter in the "web.config" file is used to perform matching; rather block 782 retrieves specific parameters to select all profiles containing that parameter value from the current subset of all profiles retrieved so far. Each search using the next parameter=value in the hierarchy returns some number of profiles with that matching value. This process repeats until only one profile matching that parameters value is returned from the database 430, or all discriminating values have been processed with zero or more than one profiles remaining in the final set. This implements a half splitting approach to eliminating non-matching profiles until a match is discovered, or we have half split as far as we can using the hierarchy of discriminating parameter=values.

Decision block 784 tests whether the current "web.config" parameter=value used in block 782, to reduce the current subset of profiles from previous processing results in a single remaining profile. If more than one profile remains, the NO decision path 785 is executed invoking decision block 786.

Block 786 tests whether all properties in the hierarchy to use to half split the remaining subset of profiles have been used. If additional properties to search remain, the next property and its value is used as the database search criteria, returning the subset of the previous set of profiles from the previous search by executing the NO decision execution path 787, repeating the processing loop for each remaining discriminator until all have been processed or a single profile resulted from eliminating all others.

In the case where a single profile remains following a search of the previous subset of profiles containing the next discriminator parameter=value, the profile previously saved for client devices previously performing a unique device identification management system request is discovered. This case is signified by executing the YES execution path 790 by decision block 784 to invoke block 794. The processing of block 794 replaces the temporary profile assigned automatically by Microsoft's .NET anonymous profile system to every new user request with the previous profile corresponding to the current requesting client device 5.

Upon completion of the just described processing by block 794, block 796 is executed via execution path 795. The processing performed on the current profile, now the device profile previously stored in the database 430 during a previous request, by block 796 was discussed previously and is identical to that described when invoked by the execution path 766 from block 765 for a first time device request from a client device 5 supporting browser cookies.

In the case where all discriminating device attributes in the "web.config" file have been used to half split the remaining subset of profiles matching previous device discriminating information, and more than one profile remain from the previous set, the YES execution path 788 is executed by decision block 786 to invoke processing block 789. Block 789 performs the well known and commonly used similarity correlation technique known as Tanimoto similarity testing. Tanimoto coefficient (extended Jaccard coefficient) Cosine similarity is a measure of similarity between two vectors of n dimensions by finding the angle between them. Given two vectors of attributes, A and B, the cosine similarity, θ, is represented using a dot product and magnitude. The advantage of the Tanimoto technique is that profiles of different length vectors can be directly compared and a similarity correlation calculated. Tanimoto allows the unique identification management system to take in to account discriminating values that can change from request to request as well as those that don't and with a high degree of certainty perform a fuzzy match of an incoming profile from a device and its past profile from a previous unique device identification request. Since the algorithm itself is well used throughout many disciplines and well documented, it will not be discussed further. The current temporary profile automatically assigned by Microsoft's .NET Anonymous Profile system has its Tanimoto similarity coefficient calculated against each of the remaining profiles from the database remaining at the completion of the previously described half splitting of the last profile attribute in the hierarchy. As discussed previously, not all device attributes are used to perform this half splitting down of the subset of profiles matching the list of parameter values used. Upon completion of processing by block 789, execution of decision block 791 is invoked by execution path 701.

A configurable threshold is used in the Unique Device Identification Management System 400, derived empirically, in order to determine a similarity match between profiles previously saved in the database 430 and the current requesting client device 5. If one or more profiles are determined to be below the Tanimoto threshold, the profile having the lowest similarity coefficient is deemed to be a match for the currently requesting device. Decision block 791, executes the YES decision path 793 to invoke block 794 if a lowest profile is found to be below the similarity threshold. The processing of block 794 replaces the temporary profile assigned automatically by Microsoft's .NET anonymous profile system to every new user request with the previous profile corresponding to the current requesting client devices 5. Upon completion of the just described processing by block 794, block 796 is executed via execution path 795. The processing performed on the current profile, now the device profile previously stored in the database 430 during a previous request, by block 796 was discussed previously and is identical to that described when invoked by the execution path 766 from block 765 for a first time device request from a device supporting browser cookies.

Decision block 791, as previously described, tests whether one or more profiles remaining after block 789 processing completes, are determined to be below the Tanimoto similarity threshold discussed previously. If no profiles fall below that empirically derived threshold, the NO path, 792, executes block 765 via NO path 792, signifying a first time unique device identification request was received from client device 5 shown in FIG. 1B. In this scenario, a temporary profile was assigned to the request by Microsoft's .NET Anonymous Profiling system and block 765 processing will save the profile name, i.e., its primary database key, as the GUID assigned to the unique device. Upon completion, block 796 is invoked by execution path 766. Block 796 is responsible for updating the current new device profile with all device identifying values contained in the transmission of a request at 418 received by block 428 shown in FIG. 4, examples of which are described in a later section, and then saves the populated profile to the database with the device discriminating values.

D. Unique Device Identification Profile Properties

The following list presents a subset of properties that can make up a uniquely identifying user profile, as specified within a .NET application's "WEB.CONFIG" configuration file. The .NET profiling system automatically allows new attributes to be dynamically added without impacting data saved in existing user profile records due to the object relational model overlay. A subset of the attributes documented are attributes appropriate for campaign management systems when selected as the implementation platform.

"LastVisitedDate"

This is the date the last time the unique device profile was accessed.

"Name"

This is the globally unique ID assigned to the table entry by the .NET framework when a new record is created, i.e., its primary key, and is used as the device identifying cookie value used to map to the user database entry on subsequent ad requests.

"Cookie or GUID Cookie"

This is a special unique device identification cookie value and is initialized to zero the first time set before verifying the end device supports cookies. If cookies are supported this value will be set with the "NAME" property above as a way to distinguish first time visitors from previous visitors already in the database. It should be appreciated that although cookies are implemented in accordance with the present invention, the present invention allows for unique identification of client devices in all cases, regardless of whether or not cookies are supported by the client device. Not all client device support cookies, e.g., less than 50% devices support cookies from our analysis of past campaigns. From a scalability and performance perspective, for those client devices that do support cookies there is no database search required rather the cookie becomes the direct index to the device profile, so if the present system is capable of setting and reading a cookie in the client device, it behooves us to take advantage of that fact, but for those that don't we have other discriminators we use to search the database for a previous profile for the device. If someone clears their cookies we can still identify the device using all the other discriminators.

"GUID"

This is the globally unique device identifier assigned value, used to uniquely identify a previous requesting device. It is transmitted to the user device as part of the redirect to an external system for its use, e.g., an ad management system tracking uniques and performing frequency capping for the number of times a specific user is presented a specific advertisement, and should normally match the "Name" value in the device profile.

"Site"

This is the SITE=VALUE pair from the request to the unique device identification management system. That value is assigned operationally to identify the publisher with whom a contract was consumated for purposes of analytic reports as well as billing. This particular attribute can be used to descriminate similar users browsing different sites in the network.

"HTTPHeaders"

This is the complete set of HTTP headers sent from the device to the .NET unique device identification management application. It contains data that varies by device and which is parsed to provide fine grain descriminators to differentiate users within and across device types. For example, mime types supported and capabilities such as ECMAScript support are included.

"RawReferrer"

This is the URL address of the publisher content page from which a request was rendered by the end user device. This is transmitted by the end user device to the unique device identification management profiling system as one of the HTTP attributes and contains the original referring page performing the unique device identification request.

"UserIP"

This is the raw IP address of the end user device. DHCP dynamic allocation of IP addresses renders this unusable as a host address descriminating parameter, except within a single session. However, the network front part of that address can be used to provide the network within the carriers IP range the user is accessing from as a descriminator parameter.

"QueryString"

This value is returned from the server side include variable %%QUERYSTRING%% transmitted within the request url. It provides a facihy for publisher engines embedded in the ad request data path to append uniquely identifying parameters which can then be used by the profiling system to identify publisher specific content tracking attributes.

"AppReqDateTime"

This is the date and time of a request being made from the end user device rendering the device identification request tags. This value is returned from the server side include variable %%DATETIME%% received within the request url to the device identification profile management application.

"AppRequest"

This is the URL address of the actual request sent to the unique device identification management system which is returned from the request URL server side include variable %%REQUEST%% transmitted by the end user device in the request URL.

"AppReqAgent"

This is the HTTP Agent string received by the unique device identification management system when it receives a request from the end user device. This value is returned from the server application include variable %%AGENT%%.

"AppCONTEXT1"

This is the CONTEXT1=VALUE parameter contained in the URL address of the actual request sent if used which is returned from the server side include variable %%REQUEST%%. This value is transmitted by context extraction systems in a request url to the unique device identification management application from which the CONTEXT1. This is the textual context determined by the context extraction engine appended to the device request to be passed as a targeting parameters.

"AppCONTEXT2"

This is the CONTEXT2=VALUE parameter contained in the URL address of the actual request sent if used which is returned from the server side include variable %%REQUEST%%. This value is transmitted by context extraction systems in a request url to the unique device identification management application from which the CONTEXT1. This is the textual context determined by the context extraction engine appended to the device request to be passed as a targeting parameters.

"AppCONTEXT3"

This is the CONTEXT1=VALUE parameter contained in the URL address of the actual request sent if used which is returned from the server side include variable %%REQUEST%%. This value is transmitted by context extraction systems in a request url to the unique device identification management application from which the CONTEXT1. This is the textual context determined by the context extraction engine appended to the device request to be passed as a targeting parameters.

"AppCARRIER"

This is the CARRIER=VALUE parameter determined by the unique device identification management system based on the network IP address in the request URL address of the actual request sent from the device.

"AppDEVICE"

This is the DEVICE=parameter determined by the unique device identification management system. This value is determined from the agent HTTP header transmitted from the WURFL device capabilities detection system provided to the unique device identification profile management application within the redirect url from which the DEVICE portion is extracted as the mobile device type executing the originating request requesting from a publisher site.

"AppSCRNWIDTH"

This is the SCRNWIDTH=VALUE parameter determined by the unique device identification management system. This value is determined from the screen width specification transmitted from the WURFL device capabilities detection system provided to the unique device identification profile management application within the redirect url from which the SCRNWIDTH portion is extracted as the mobile device type executing the originating request requesting from a publisher site.

"AppSCRNHEIGHT"

This is the SCRNHEIGHT=VALUE parameter determined by the unique device identification management system. This value is determined from the screen width specification transmitted from the WURFL device capabilities detection system provided to the unique device identification profile management application within the redirect url from which the SCRNHEIGHT portion is extracted as the mobile device type executing the originating request requesting from a publisher site.

"Traceroute"

A Traceroute is performed as an asynchronous process to capture the Internet routers through which the user mobile device host IP packets travel on their way to the user profiling system. The ICMP protocol is employed to PING and determine each router on the path using an incrementing TIME TO LIVE. That TCP/IP message triggers responses from each of the routers making up the Internet path, with the last router in the chain returning a path completion message. Even though the route can change with each connection through the Internet, the Gateway closest to the user device remains consistent for the most part, and can be used as a final descriminating parameter in the user's profile if required to differentiate users.

Additional Parameters

Anyone skilled in the art, will recognize the list above as merely a subset of the device, network Internet gateway, and unique user identification management server attributes that can be used in the present invention. A great deal more are available for use, but the above representative examples are merely presented to minize the length of this patent.

As technologies change and mobile network owners modify their protocols to encompass new services, additional parameters can be made available for unique device identification descriminating capabilities. Additonally, some of the parameters described in this document will no longer be relevant and can be deleted from the user profiles.

As the foregoing disclosure shows the present system operates without embedding specific advertising HTML file requests within a web page at the publisher system prior to delivery to an end user. Additionally, the present invention provides for mobile Internet anonymous device identification performed outside the wireless network, persistent across user sessions, which allows accommodating online advertising capabilities and accounting methods currently standardized for the non-mobile Internet.

The present system, therefore, provides considerable economies to mobile advertisers and mobile publishers in saved labor, time and cost in terms of accomplishing the same capabilities associated with browser cookies in online advertising. In addition, the present system functions in a manner that is substantially, if not totally, transparent to a user and which neither inconveniences nor burdens that user or content publishers. The present system does not require a publisher nor a user to download and install on his or her content management system or mobile device a separate application program, let alone any update to it, specifically to transmit or receive online advertising, or perform any affirmative act, other than normal Internet content delivery and browsing, to receive such advertising. Furthermore, this present system is platform independent and, by doing so, operates with substantially any mobile device browser on substantially any mobile device. Lastly, the present system provides proper accounting to an advertiser by accurately and validly ascertaining user impressions of fully rendered mobile advertisements, as well as provides for frequency capping the number of times a mobile user is exposed to an advertisement, and additionally captures the number of unique visits to a mobile publisher's site.

Ultimately, the present system provides for a new anonymous unique device identifying system, which will effectively achieve broad support and use by advertisers and acceptance by mobile Internet users, resulting in the substantial expansion in the use of mobile advertising in general.

Although a single embodiment which incorporates the teachings of the present invention has been shown and described in considerable detail herein, those skilled in the art can readily devise many other embodiments and applications of the present invention that still utilize these teachings.

We claim:

1. A system for implementing in a networked client-server environment an anonymous and user-transparent technique for uniquely identifying network-distributed devices, comprising:

a content server connected to a client device via a global communication network and comprising a first software module and a content server processor, the first software module including instructions that when executed by the content server processor direct the content server processor to transmit from the content server to the client device a content page having a plurality of computer readable instructions representing page content and an embedded code for downloading and executing a script on the client device;

a script server connected to the client device via the global communication network and comprising a second software module and a script server processor, the second software module including instructions that when executed by the script server processor direct the script server processor to transmit the script to the client device, the script being configured for transparently inserting unique device identification requests into the content page;

a unique device identification management system in communication with the client device via the global communication network and comprising a third software module and a third processor, the third software module including instructions that when executed by the third processor direct the third processor to:
receive, from the client device, unique device identification data, wherein the unique device identification data does not comprise a browser side cookie,
select a globally unique identifier for association with the client device, and
save the globally unique identifier in a database of the unique device identification management system; and a unique device profile management system in communication with the unique device identification management system and comprising a fourth software module and a fourth processor, the fourth software module including instructions that when executed by the third processor direct the fourth processor to retrieve device profiles existing in a profile database of the unique device profile management system for comparison with a profile of the client device, wherein the unique device identification management system comprises a device capabilities database system which appends select device capabilities to an incoming Internet address URL received from a device browser of the client device and redirects the request to the unique device profile management system.

2. The system according to claim 1, wherein the device browser is a mobile device browser.

3. The system according to claim 1, wherein the script is dynamically generated by the script server.

4. The system according to claim 1, wherein the unique device profile management system is a Microsoft's .NET anonymous user profile system.

5. The system according to claim 1, wherein the unique device profile management system retrieves a profile of the client device, retrieves all device profiles existing in a profile database, and sequentially eliminates profiles not matching until a single profile is left or all profiles have been used and if a single profile is left, that profile is identified as the current requesting client device and the profile is updated in the database from a previous request from the same client device.

6. The system according to claim 1, wherein the unique device profile management system retrieves a profile of the client device, retrieves all device profiles existing in a profile database, and sequentially eliminates profiles not matching until a single profile is left or all profiles have been used; and if more than one profile is left, the current requesting device profile is compared against each remaining device profile using Tanimoto similarity correlation, and if a single remaining device profile matching all hierarchical list of a subset "property=value" triplets is below a predefined Tanimoto similarity coefficient threshold when compared with the current requesting profile, that profile is identified as the current requesting device profile updated in the database from a previous request from the same device; and a response is sent to the originating device, with the globally unique identifier associated with the device in the device profile management database embedded in the response and returned to the device browser originating the unique device identification request.

7. The system according to claim 1, wherein the unique device profile management system retrieves a profile of the client device, retrieves all device profiles existing in a profile database, and sequentially eliminates profiles not matching until a single profile is left or all profiles have been used; and if no remaining device profiles is below a predefined Tanimoto similarity coefficient threshold when compared with the current requesting profile, the current profile is identified as a first time request from the unique device and is saved in the database as a new device profile, and a response is sent to the originating device, with the globally unique identifier associated with the device in the device profile management database embedded in the response and returned to the device browser originating the unique device identification request.

8. The system according to claim 1, wherein the unique device profile management system retrieves a profile of the client device, retrieves all device profiles existing in a profile database, and sequentially eliminates profiles not matching until a single profile is left or all profiles have been used, retrieves all device profiles existing in the database that match the current request profile, and sequentially eliminates profiles not matching until a single profile is left or all values have been used, and if zero remaining device profiles remain, the current profile is identified as a first time request from the unique device and is saved in the database as a new device profile, and a response is sent to the originating device, with the globally unique identifier associated with the device in the device profile management database embedded in the response and returned to the device browser originating the unique device identification request.

9. A method for implementing in a networked client-server environment an anonymous and user-transparent technique for uniquely identifying network-distributed client devices wherein the method comprises:

transmitting to a client device a content page having a plurality of computer readable instructions representing page content and an embedded code for downloading and executing a script on the client device;

transmitting the script to the client device, from a first server, the script being configured for transparently inserting unique device identification requests into the content page;

receiving, from the client device, non-cookie device discriminating information, wherein the non-cookie device discriminating information does not comprise a browser side cookie;
determining, based on the non-cookie device discriminating information, whether an identifying matching profile of the client device already exists, wherein determining comprises:
retrieving a plurality of device profiles existing in a profile database, and
sequentially eliminating the device profiles not matching the non-cookie device discriminating information until either a single device profile is left or all of the plurality of device profiles have been eliminated; and
performing:
in the case where a single profile is left, identifying the single profile as the matching profile created by a previous request from the client device, retrieving a previously created globally unique identifier associated with the client device, and communicating the globally unique identifier to the client device, or
in the case where all device profiles have been eliminated, generating a new globally unique identifier for the client device, storing the globally unique identifier in a database and communicating the globally unique identifier to the client device.

10. The method according to claim 9, wherein the embedded code performs a request for the script from the first server and the first server is a networked script server.

11. The method according to claim 10, wherein the networked script server dynamically generates the script.

12. The method according to claim 9, wherein the script executes in a device browser of the client device and dynamically inserts unique device identification request tags into the first content page.

13. The method according to claim 12, wherein the dynamically inserted unique device identification request tag performs a unique device identification system request to a second server.

14. The method according to claim 13, wherein the second server is a unique device identification management system.

15. The method according to claim 14, wherein the unique device identification management system comprises a device capabilities database system which appends select device capabilities to an incoming Internet address URL received from the device browser of the client device and redirects the request to a unique device profile management system.

16. The method according to claim 15, wherein the unique device profile management system is a Microsoft .NET anonymous user profile system.

17. The method according to claim 9, further including the step of communicating the globally unique identifier to the client device.

18. The method according to claim 17, further including the step of communicating the globally unique identifier to a third server.

* * * * *